US00RE50276E

(19) United States
(12) Reissued Patent
Zhang

(10) Patent Number: US RE50,276 E
(45) Date of Reissued Patent: Jan. 21, 2025

(54) ELECTROCHEMICAL SYSTEM FOR STORING ELECTRICITY IN METALS

(71) Applicant: e-Zinc Inc., Mississauga (CA)

(72) Inventor: Xiaoge Gregory Zhang, Mississauga (CA)

(73) Assignee: e-Zinc Inc., ON (CA)

(21) Appl. No.: 18/085,392

(22) Filed: Dec. 20, 2022

Related U.S. Patent Documents

Reissue of:
(64) Patent No.: 10,886,552
Issued: Jan. 5, 2021
Appl. No.: 15/398,533
Filed: Jan. 4, 2017

U.S. Applications:
(63) Continuation of application No. 14/462,019, filed on Aug. 18, 2014, now Pat. No. 9,553,328.
(Continued)

(51) Int. Cl.
*H01M 8/18* (2006.01)
*H01M 8/22* (2006.01)
(Continued)

(52) U.S. Cl.
CPC ..... *H01M 8/184* (2013.01); *H01M 8/22* (2013.01); *H01M 8/225* (2013.01);
(Continued)

(58) Field of Classification Search
CPC ..... H01M 8/184; H01M 8/22; H01M 8/225; H01M 12/065; H01M 12/08; Y02E 60/10; Y02E 60/50
See application file for complete search history.

(56) References Cited

U.S. PATENT DOCUMENTS 3,758,342 A 9/1973 Baba
3,879,225 A 4/1975 Backhurst et al.
(Continued)

FOREIGN PATENT DOCUMENTS

CN 1133225 C 12/2003
CN 104781981 B 7/2015
(Continued)

OTHER PUBLICATIONS

Office Action in counterpart Japanese Patent No. 6335303, Aug. 29, 2017.
(Continued)

*Primary Examiner* — Norca L. Torres Velazquez
(74) *Attorney, Agent, or Firm* — Johnson, Marcou, Isaacs & Nix, LLC; John S. Seers

(57) ABSTRACT

An electrochemical cell system, including: a housing; an electrolyte disposed in the housing; a plurality of discharging cathodes immersed in the electrolyte and a plurality of first spaces between the discharging cathodes, a metallic material, when placed in the first spaces, forms a plurality of discharging anodes; an electrochemical system, including: a housing, an electrolyte disposed in the housing, a discharging assembly immersed in the electrolyte including one or more discharging cathodes and a first space amid the discharging cathodes and the interior surface of the housing, a metallic material, wherein the first space contains the metallic material to form one or more discharging anodes, and a second space above the discharging assembly contains the metallic material in excess of the portion in the first space; and methods of simultaneous charging and discharging.

20 Claims, 37 Drawing Sheets

Related U.S. Application Data

Figure 1A:
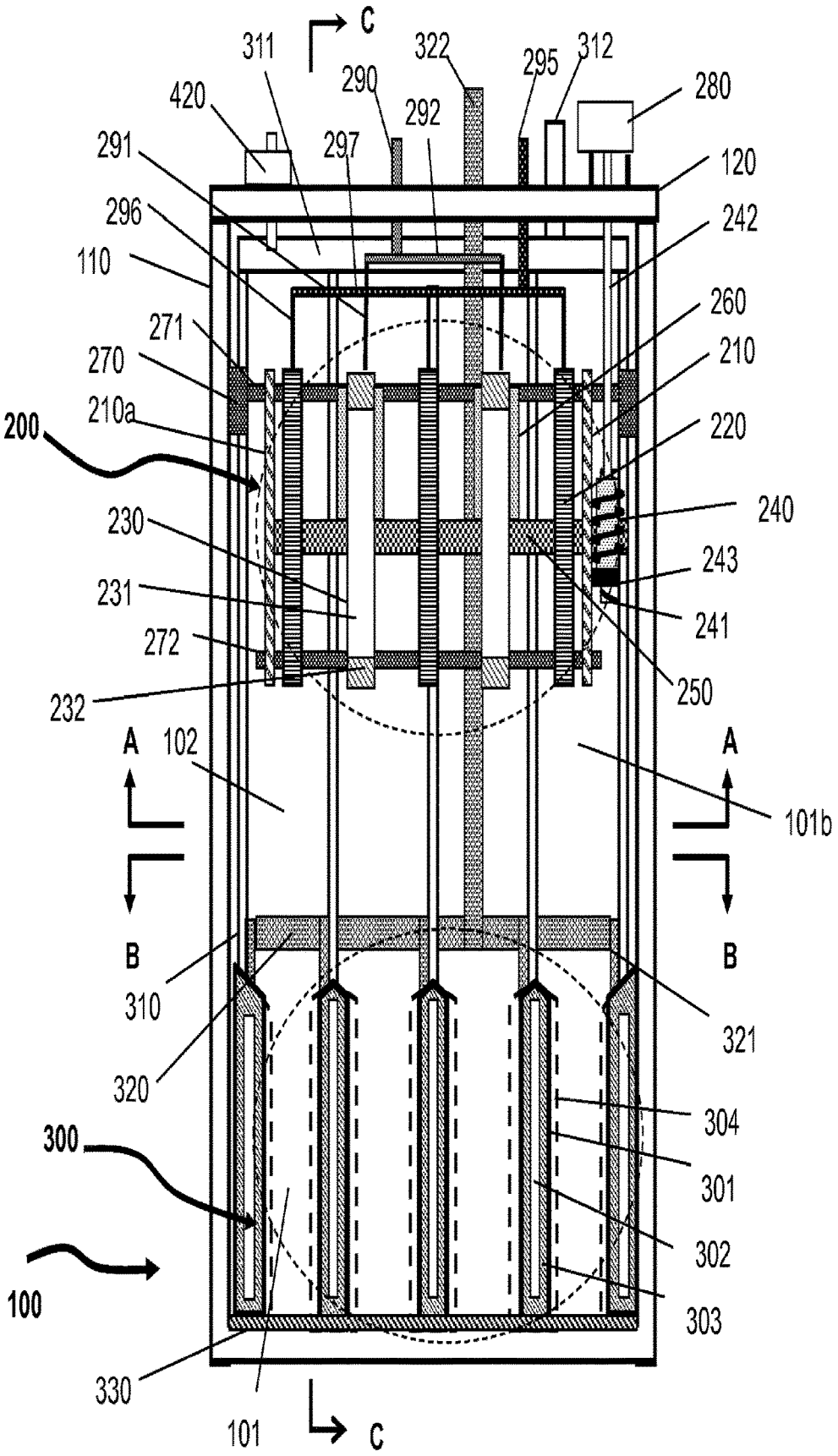

(60) Provisional application No. 61/870,104, filed on Aug. 26, 2013.

(51) Int. Cl.
*H01M 12/06* (2006.01)
*H01M 12/08* (2006.01)

(52) U.S. Cl.
CPC ..... *H01M 12/065* (2013.01); *H01M 12/08* (2013.01); *Y02E 60/10* (2013.01); *Y02E 60/50* (2013.01)

(56) References Cited

U.S. PATENT DOCUMENTS

| | | | | |
|---|---|---|---|---|
| 3,977,903 | A | 8/1976 | Jacquelin | |
| 3,981,747 | A | 9/1976 | Doniat et al. | |
| 4,037,023 | A * | 7/1977 | Grehier | H01M 4/8626 429/453 |
| 4,126,733 | A | 11/1978 | Doniat | |
| 4,147,839 | A | 4/1979 | Solomon et al. | |
| 4,172,924 | A | 10/1979 | Warszawski | |
| 4,198,475 | A | 4/1980 | Zaromb | |
| 4,341,847 | A | 7/1982 | Sammells | |
| 4,719,156 | A | 1/1988 | Niksa et al. | |
| 5,006,424 | A | 4/1991 | Evans et al. | |
| 5,196,275 | A | 3/1993 | Goldman et al. | |
| 5,208,526 | A | 5/1993 | Goldman et al. | |
| 5,434,020 | A | 7/1995 | Cooper | |
| 5,607,788 | A | 3/1997 | Tomazic | |
| 5,849,427 | A | 12/1998 | Siu et al. | |
| 5,952,117 | A | 9/1999 | Colborn et al. | |
| 6,706,433 | B2 | 3/2004 | Pinto | |
| 8,236,440 | B2 | 8/2012 | Bendert | |
| 8,293,390 | B2 | 10/2012 | Winter | |
| 8,603,702 | B2 * | 12/2013 | Kim | H01M 2/162 429/406 |
| 9,553,328 | B2 * | 1/2017 | Zhang | H01M 8/184 |
| 2004/0053132 | A1 | 3/2004 | Smedley | |
| 2004/0140222 | A1 | 7/2004 | Smedley | |
| 2010/0002130 | A1 | 1/2010 | Kamio | |
| 2010/0021303 | A1 | 1/2010 | Nielsen et al. | |
| 2010/0031693 | A1 | 2/2010 | Yuyama | |
| 2010/0196768 | A1 | 8/2010 | Roberts et al. | |
| 2010/0316935 | A1 | 12/2010 | Friesen | |
| 2010/0330437 | A1 | 12/2010 | Burchardt | |
| 2011/0117456 | A1 | 5/2011 | Kim et al. | |
| 2013/0025206 | A1 | 1/2013 | Suzuki | |
| 2013/0252062 | A1 | 9/2013 | Wilkins et al. | |
| 2013/0280623 | A1 | 10/2013 | Yoshida et al. | |
| 2013/0285597 | A1 | 10/2013 | Goldstein | |
| 2014/0065460 | A1 | 3/2014 | Evans | |

FOREIGN PATENT DOCUMENTS

| | | | |
|---|---|---|---|
| EP | 3 039 744 | B1 | 5/2019 |
| JP | S50-74144 | A | 6/1975 |
| JP | S52-023628 | A | 2/1977 |
| JP | S61-292864 | A | 12/1986 |
| JP | 2010-520150 | A | 6/2010 |
| JP | 2011-527808 | A | 11/2011 |
| JP | 2012-209020 | A | 10/2012 |
| JP | 6335303 | B2 | 10/2016 |
| WO | WO 2011/073975 | A2 | 2/2011 |

OTHER PUBLICATIONS

"Extended European Search Report in related European Patent Application No. 14839312.7", Dec. 21, 2016.

"International Search Report and Written Opinion", for PCT/IB2014/0022144, Jan. 15, 2015.

Butler, et al., "Zinc/Bromine Batteries in Handbook of Batteries", McGraw Hill, Chapter 39, 1995, 1-5.

Cooper, "Powering Future Vehicles with Refuelable Zinc/Air Batter", Science & Technology Review, Oct. 1, 1995, 6-13.

Skyllas-Kazacos, et al., "Progress in Flow Battery Research and Development", Journal of the Electrochemical Society, vol. 158(*), Jan. 1, 2011, R55-R79.

Smedley, et al., "Zinc-Air: Hydraulic Recharge", Encyclopedia of Electrochemical Power Sources, Eds. Jungen Garche etc., Amsterdam: Elsevier, Jan. 1, 2009, 12 pages.

Vanysek, "Electrochemical Series", CRC Handbook of Chemistry and Physics, 92nd Edition, CRC Press, Chapter 5, Jan. 1, 2011, 80-89.

Zhang, "A Dual Power Cell for Storing Electricity in Zinc Metal", Journal of Power Sources, vol. 285, 2015, 580-587.

Zhang, "Corrosion and Electrochemistry of Zinc", Springer, Plenum Press, New York, Chapter 1 (pp. 1-3) and Chapter 14 (pp. 373-376), Jan. 1, 1996, 8.

Zhang, "Zinc Electrodes: Overview", Encyclopedia of Electrochemical Power Sources, Eds. Jungen Garche etc., Amsterdam: Elsevier, 2009, 454-468.

Butler, et al. 2002 "Zinc/bromine batteries" in *Handbook of Batteries, Third Edition*: chapter 39; pp. 39.1-39.5; David Linden and Thomas B. Reddy Eds, McGraw-Hill.

Cooper 1995 "Powering Future Vehicles with Refuelable Zinc/Air Battery", *Science & Technology Review*, Oct. 1995: pp. 6-13.

Skyllas-Kazacos, et al. 2011 "Progress in flow battery research and development" *Journal of the Electrochemical Society* 158(8): R55-R79.

Zhang 1996 "Corrosion and electrochemistry of zinc" Springer, Plenum Press, New York, Chapter 1, pp. 1-3; and Chapter 14: 373-376 (in 8 pages).

Zhang 2009 "Secondary batteries—Zinc systems" in *Encyclopedia of Electrochemical Power Sources*, Eds. Jungen Garch et al. Amsterdam, in 16 pages.

Zhang 2015 "A dual power cell for storing electricity in zinc metal," *Journal of Power Sources* 285: 580-587.

Office Action dated Aug. 29, 2017 in counterpart Japanese patent JP 6335303 B2.

Petr Vanýsek 2011 "Electrochemical Series," in CRC Handbook of Chemistry and Physics, 92nd Edition, CRC Press), 5: 80-89.

* cited by examiner

ELECTROCHEMICAL SYSTEM FOR STORING ELECTRICITY IN METALS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

[This application is a continuation of application Ser. No. 14/462,019, filed Aug. 18, 2014, which claims priority to U.S. Provisional Application No. 61/870,104, filed Aug. 26, 2013, both of which are incorporated by reference in their entireties.] *This application is a reissue of U.S. Pat. No. 10,886,552, issued Jan. 5, 2021 from U.S. application Ser. No. 15/398,533 filed Jan. 4, 2017, which is a continuation of U.S. application Ser. No. 14/462,019, filed Aug. 18, 2014, now U.S. Pat. No. 9,553,328, which claims priority to U.S. Provisional Application No. 61/870,104, filed Aug. 26, 2013, the contents of which are herein incorporated by reference in their entireties.*

FIELD OF THE INVENTION

This invention relates to electrochemical technologies for electrical energy storage and particularly relates to metal-air batteries, fuel cells and flow batteries.

BACKGROUND OF THE INVENTION

Electricity storage is an important enabling technology for effective use of renewable energy sources such solar and wind. There are two broad categories of electricity storage applications based on the duration of storage: short durations, from a fraction of second to about one hour, and long durations, from a few hours to ten or hundred of hours. The short duration types are typically used for power support to ensure the reliability and quality of electrical power for which there are technologies in the early stage of commercial application. Long duration types are needed for applications to separate the times between generation and use of electricity at low cost. At present there is a lack of commercially viable technology for long duration type of electricity storage except for pumped hydro. However, pumped hydro is limited by availability of suitable lands due to geological environmental constrains.

Metal-air, particularly zinc-air, electrochemical systems have been seen as promising technologies for low cost large scale energy storage. There have been continuous attempts to develop energy storage systems based on zinc-air chemistry including rechargeable batteries, mechanically and hydraulically rechargeable fuel cells (see review articles by X. G. Zhang: "Zinc Electrodes", and S. Smedley and X. G. Zhang, "Zinc-Air: Hydraulic Recharge", in Encyclopedia of Electrochemical Power Sources, Eds.Jungen Garche etc., Amsterdam: Elsevier, 2009).

Electrically rechargeable zinc-air batteries have high energy density. The main technical issues have been fast degradation of the bi-functional air cathode and the detrimental change of the morphology of zinc anode during cyclic discharging and charging. Numerous development efforts have been made to resolve these technical challenges.

Some recent developments can be appreciated from the US patent applications, for example, US2010/0021303 and US2010/0316935.

For zinc-air fuel cells, the zinc active anode material is like fuel and can be generated and regenerated by electro deposition. The generation of zinc material by electro deposition serves the function of storing electricity. The deposited metallic material together with electrolyte in fluidic form is fed or fueled into the fuel cells, which serves the function of generating electricity from the stored energy in the metallic zinc. Regenerative zinc fuel cells are ideal for economical long duration energy storage for three fundamental reasons: 1) power generation and energy storage are separated such that energy can be stored independently at low cost; 2) zinc has a high energy density, highest among the common metals that can be reduced in aqueous electrolytes and 3) zinc is inexpensive, one of the lowest cost metals in the market.

Regenerative zinc-air fuel cell systems have many advantages over rechargeable battery systems such as independent scaling of power and capacity and continuous discharging without interruption for charging. Many development efforts have been made on zinc fuel cell technology as can be appreciated in the patent literature, for examples, U.S. Pat. Nos. 5,434,020, 5,849,427, 6,706,433 and US Patent Application US2010/330437. The main technical challenges have been clogging or jamming during fuelling or transporting the zinc materials into and out the electrochemical cells and uneven distribution of the materials within a cell and between the cells. It is essential to have solutions to resolve these technical problems for zinc air fuel cell to function reliably and efficiently.

Metal-redox flow batteries, particularly zinc-redox flow batteries, are another technology system that has been considered having the potential for low cost energy storage. Redox couples of bromine, cerium and iron have been used for development of zinc-redox flow battery technologies, as indicated in literature: Progress in Flow Battery Research and Development (by M. Skyllas-Kazacos et al in Journal of The Electrochemical Society, Vol. 158 (8) R55-R79), 2011, US 2013/0252062 A1, U.S. Pat. No. 8,293,390, and U.S. Pat. No. 5,607,788. As well, iron-redox flow battery has also been explored as disclosed in US 20140065460 A1. However, in the current designs of metal-redox flow batteries the capacity of the batteries is limited by the thickness of the metal anodes. It will be advantageous if the capacity of the metal-redox flow batteries is not limited by the thickness of metal anodes and thus the energy capacity can be scaled independent of power generation.

FIGURES

These and other features of the preferred embodiments of the invention will become more apparent in the following detailed description in which reference is made to the appended drawings wherein:

FIG. 1a A schematic illustration of the basic elements and structure of the electrochemical cell according to an embodiment of the present invention where the charging assembly is above of the discharging assembly in the same housing.

Figure 1B:
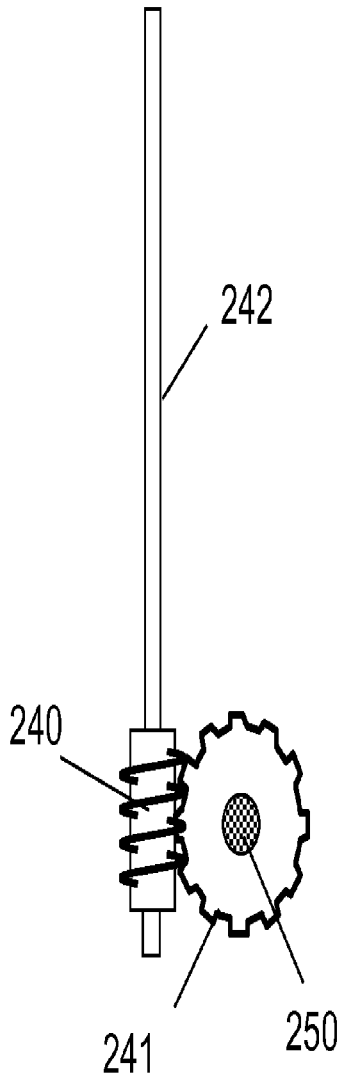

FIG. 1b A schematic illustration of the gear mechanism for mobilizing the wipers in the charging assembly.

Figure 1C:
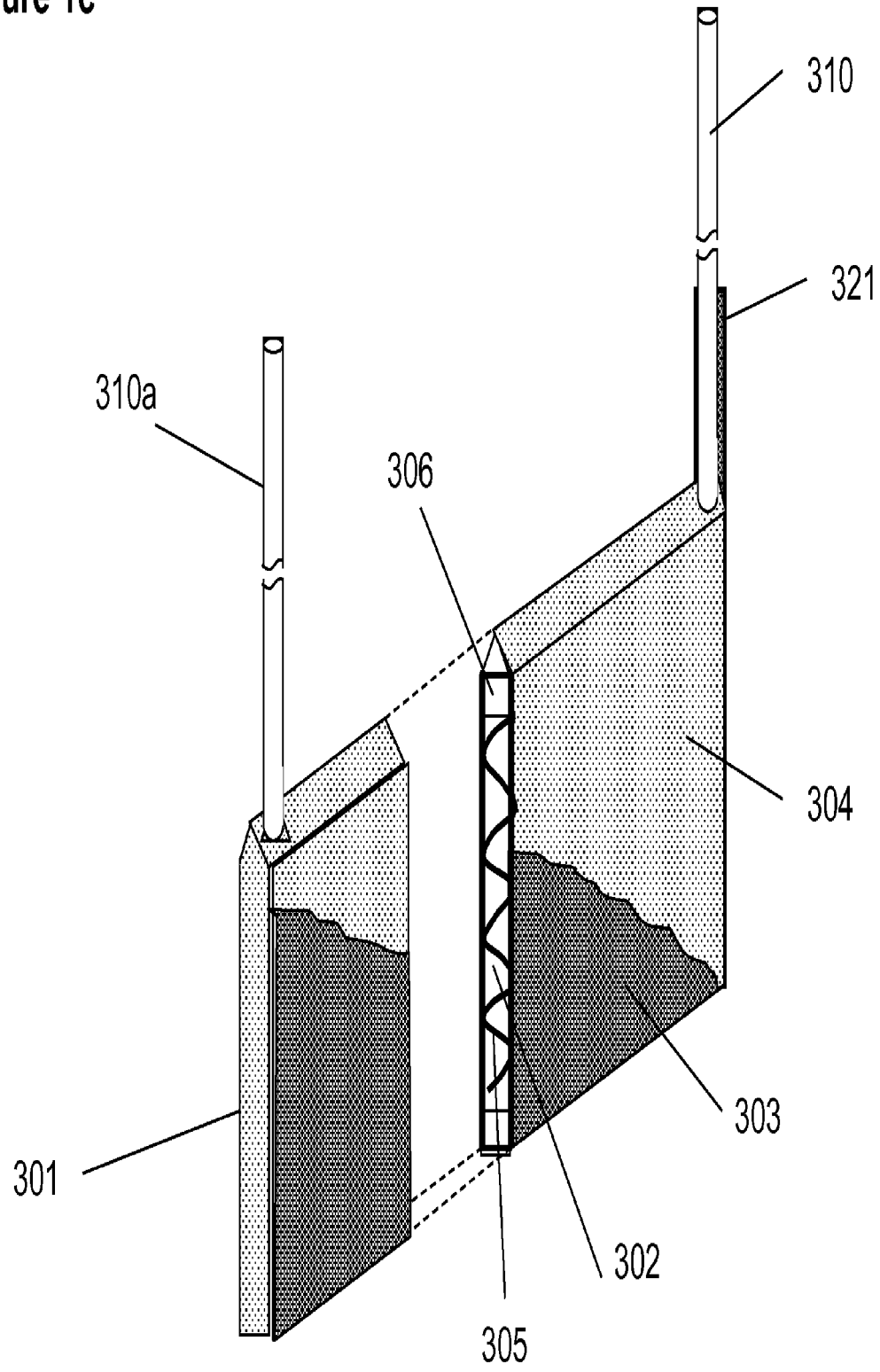

FIG. 1c A schematic perspective and cross sectional illustration of the structure of the oxygen cathode in the discharging assembly.

Figure 1D:
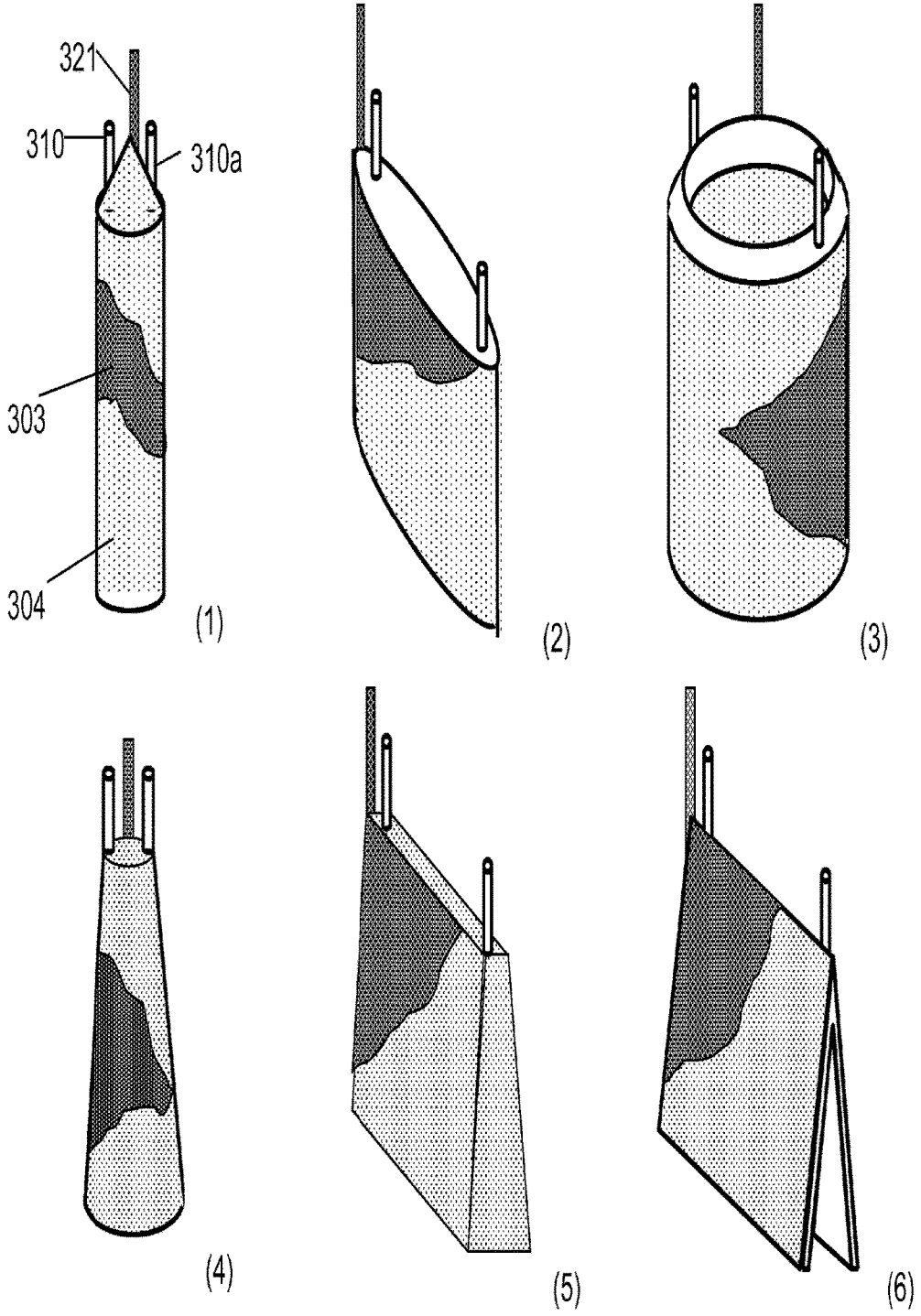

FIG. 1d A schematic perspective illustration of some of the possible structures of the oxygen cathode in the discharging assembly.

Figure 2A:
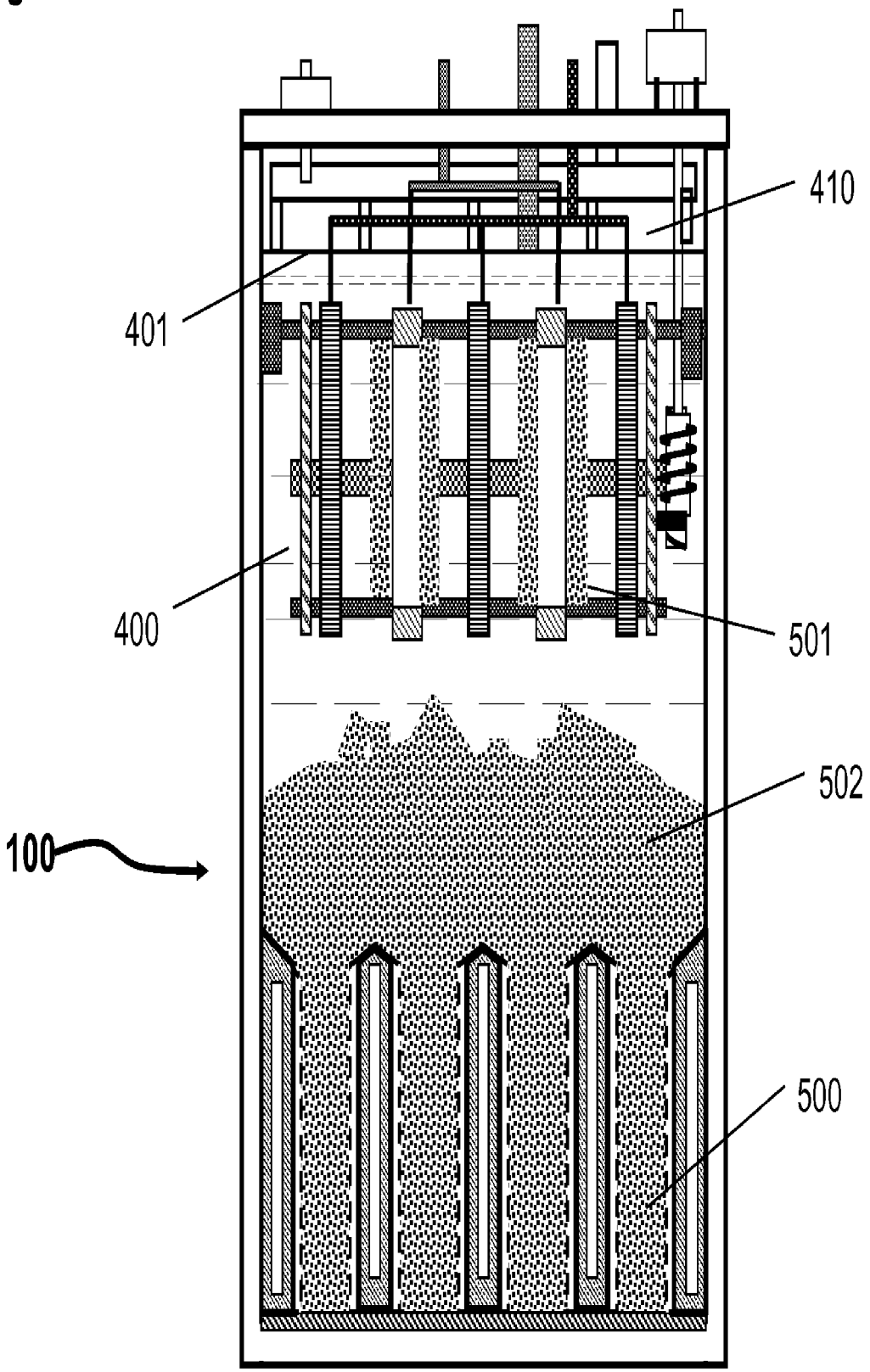

FIG. 2a A schematic illustration of the basic elements and structure of the electrochemical cell including electrolyte and deposited metal materials (same as shown in FIG. 1 with omission of some elements for simplicity)

Figure 2B:
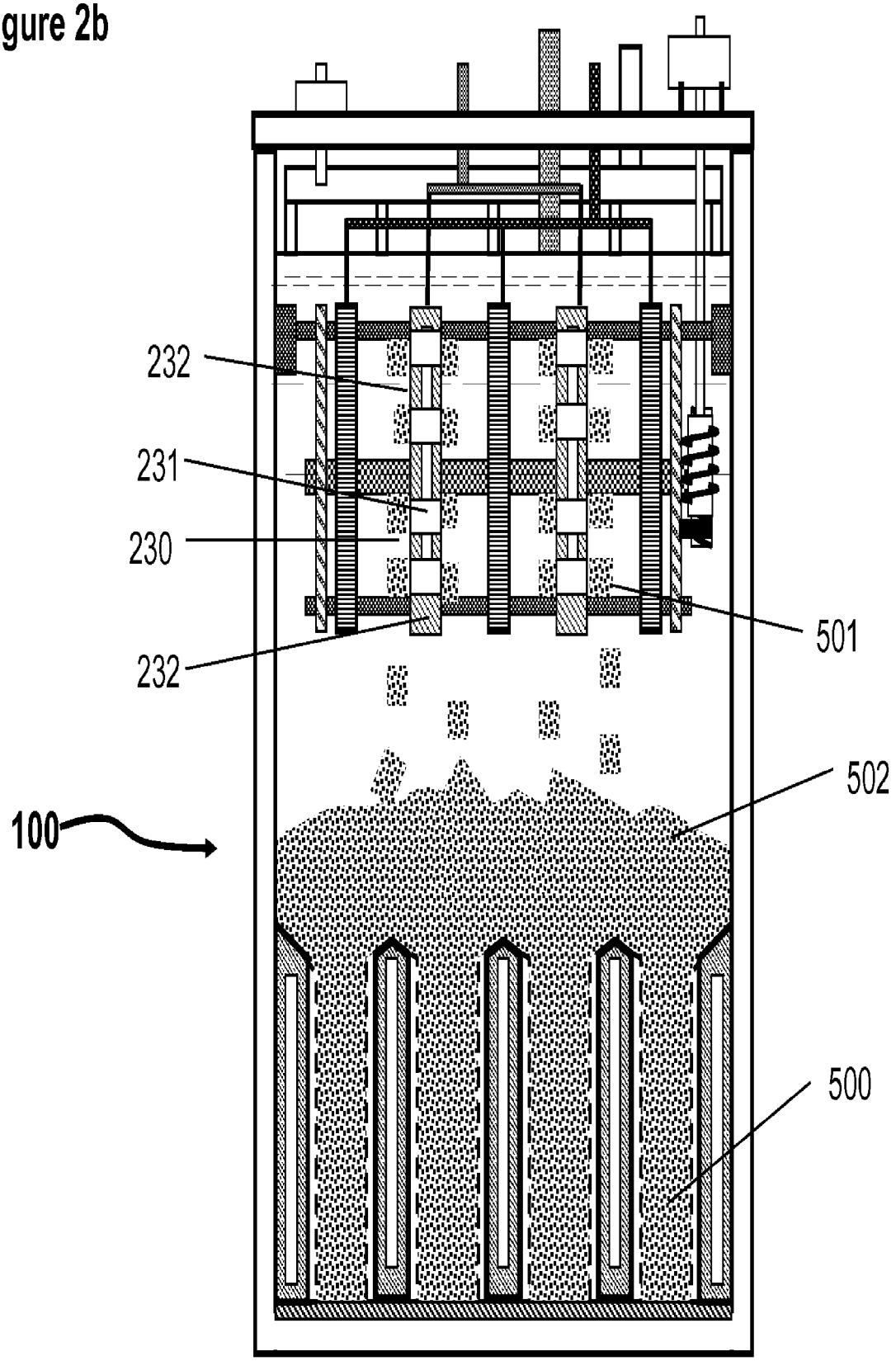

FIG. 2b A schematic illustration of the electrochemical cell system in which the cathodes in the charging assembly have a plurality of discrete active surface areas for metal deposition.

Figure 2C:
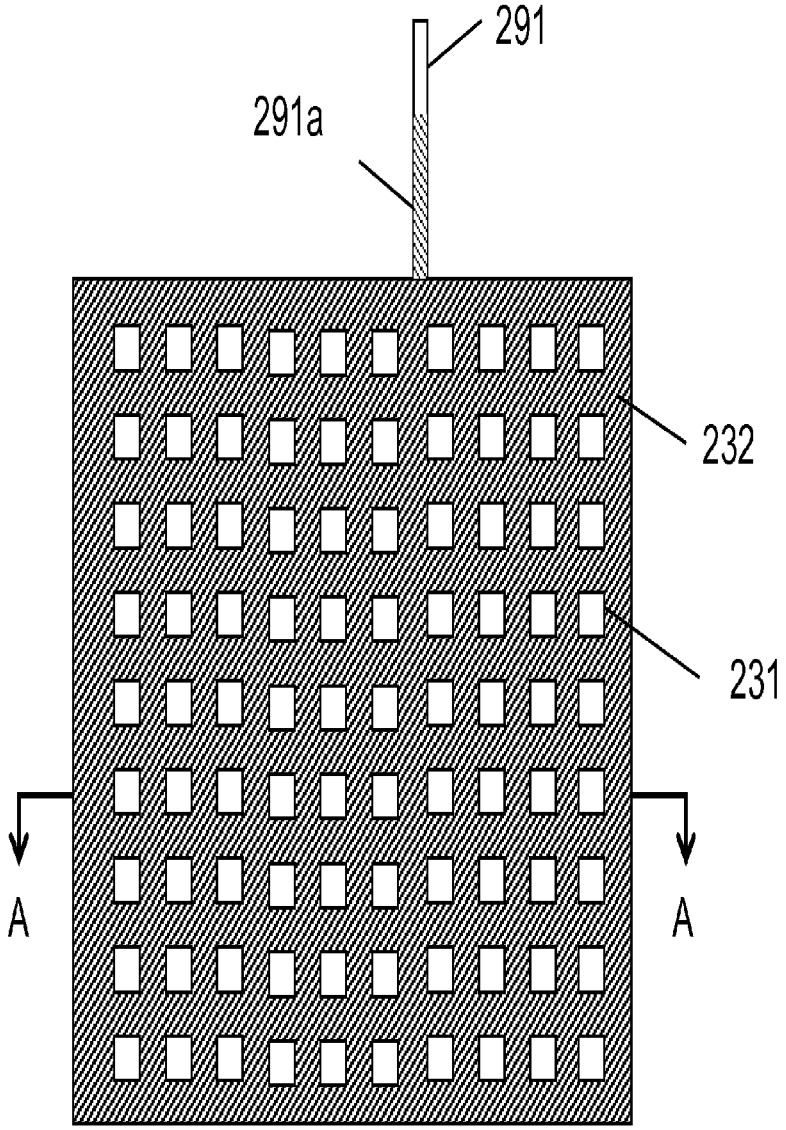
Figure 2D:
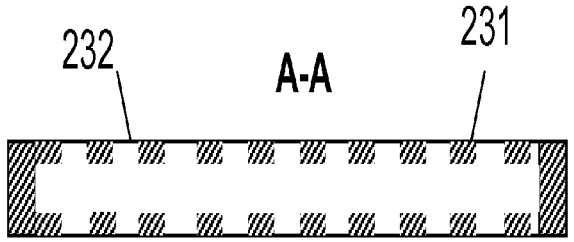

FIG. 2c A schematic illustration of a charging cathode with a plurality of discrete areas for deposition of metal;

FIG. 2d A schematic illustration of the cathode of FIG. 2c taken along the lines A-A.

Figure 2E:
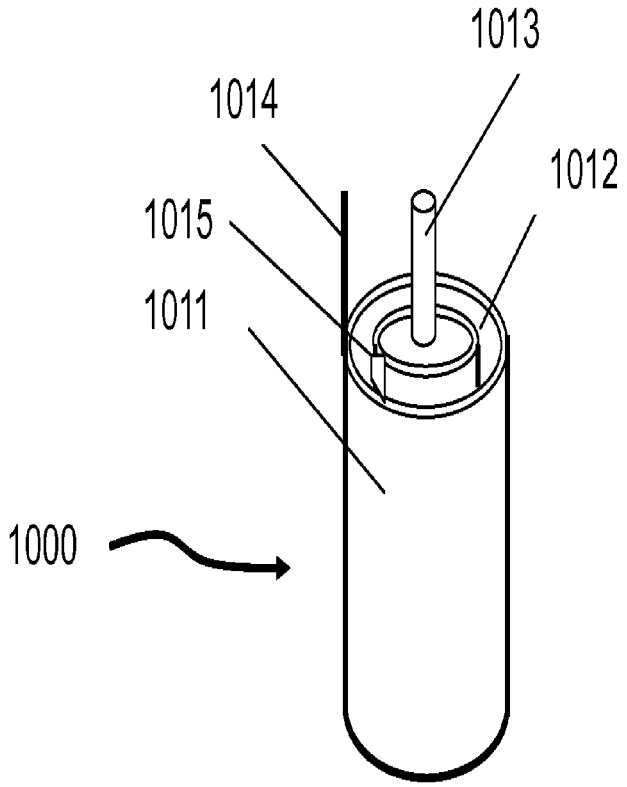
Figure 2F:
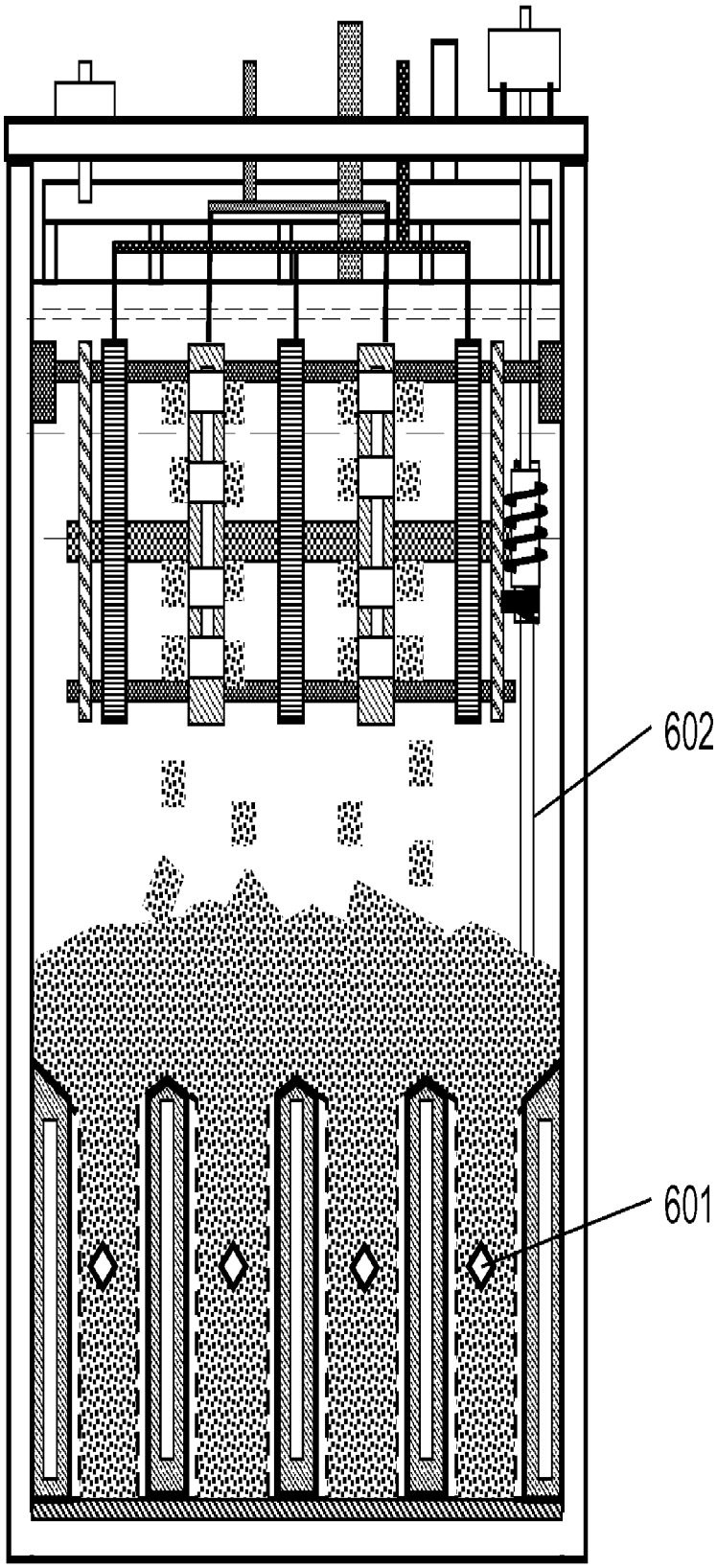

FIG. 2e A schematic illustration of the charging assembly in which the electrodes are in a cylindrical form FIG. 2f A schematic illustration of the electrochemical system having a stirring mechanism in the anode spaces in the discharging assembly.

Figure 2G:
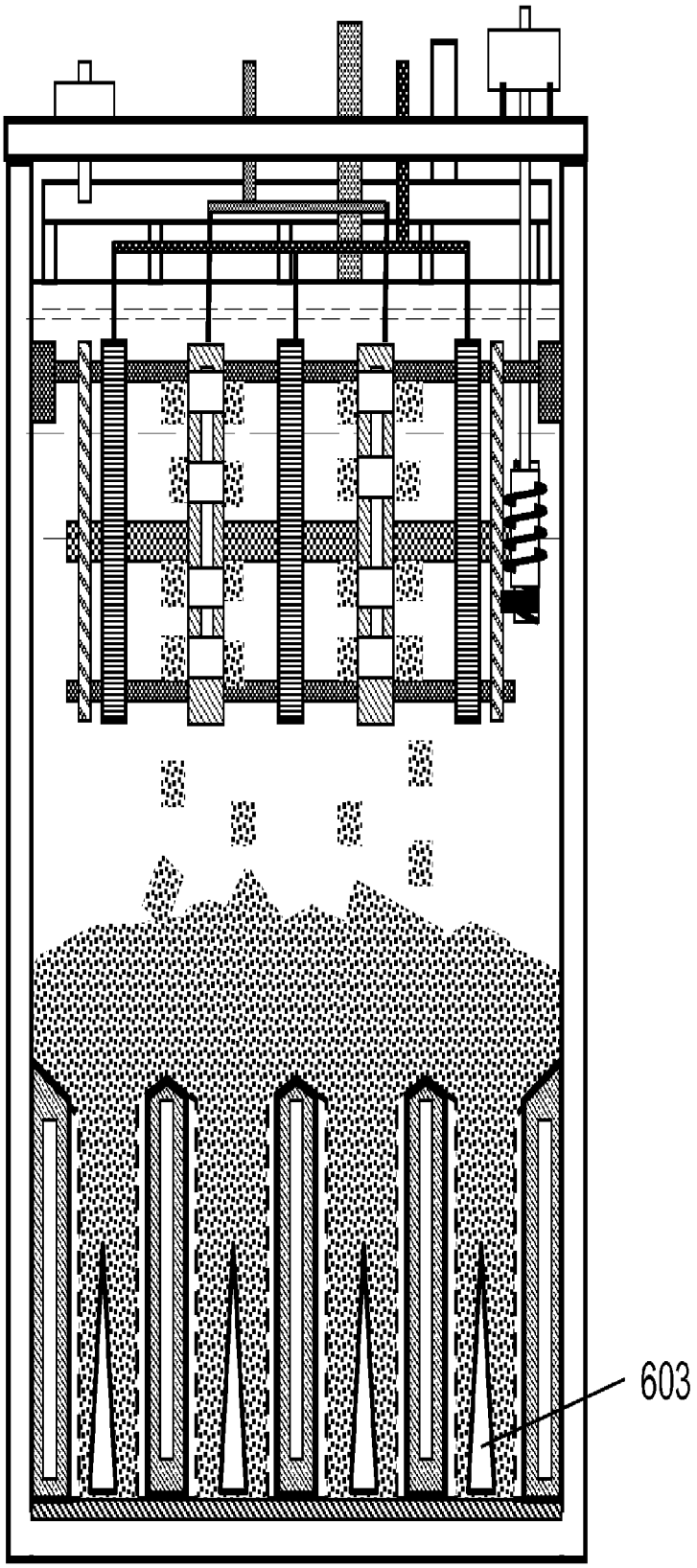
Figure 3A:
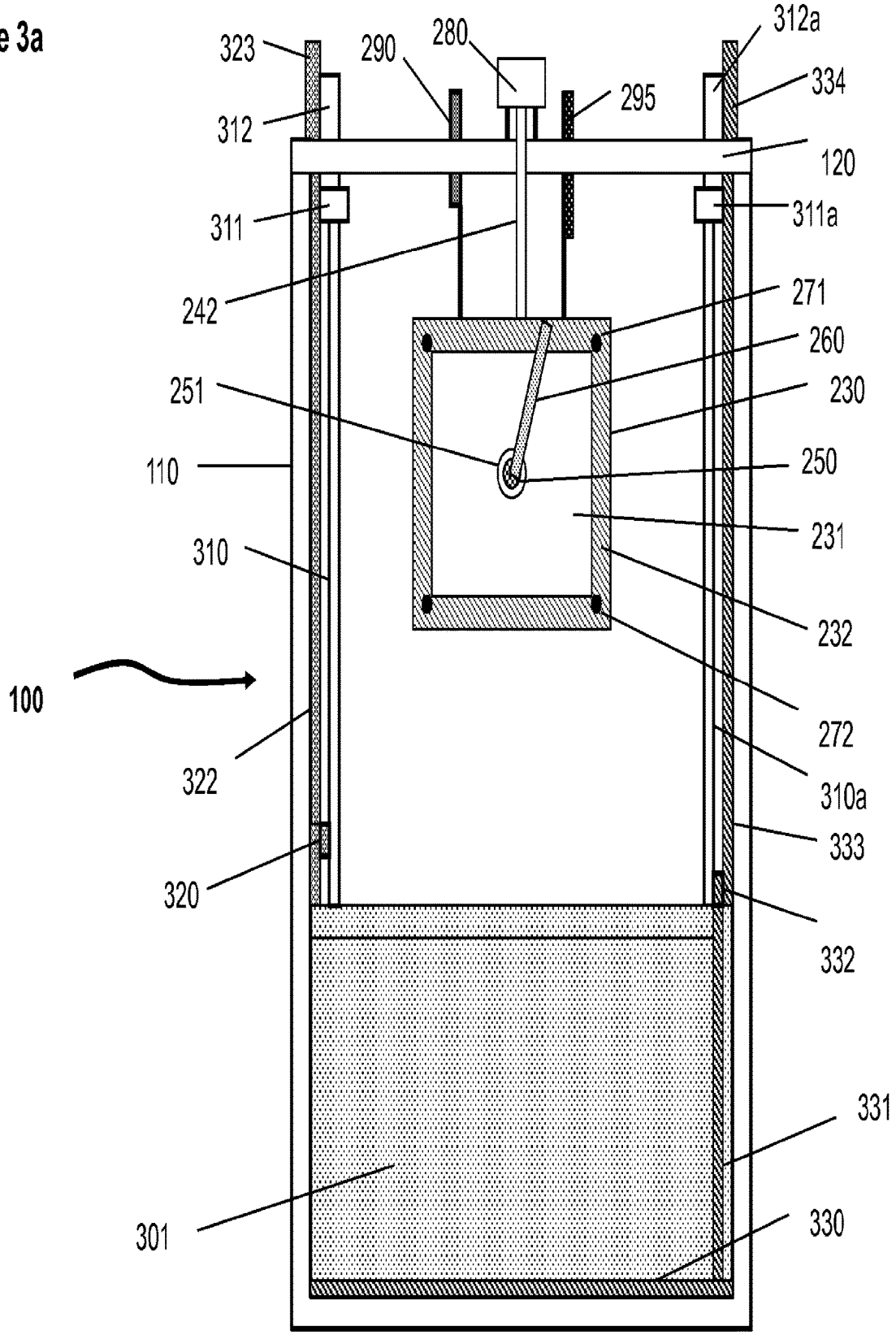

FIG. 2g A schematic illustration of the electrochemical system having a baffle between the oxygen cathodes in the discharging assembly FIG. 3a A schematic illustration of the basic elements and structure of the electrochemical cell viewed from the plane and along the lines C-C in FIG. 1.

Figure 3B:
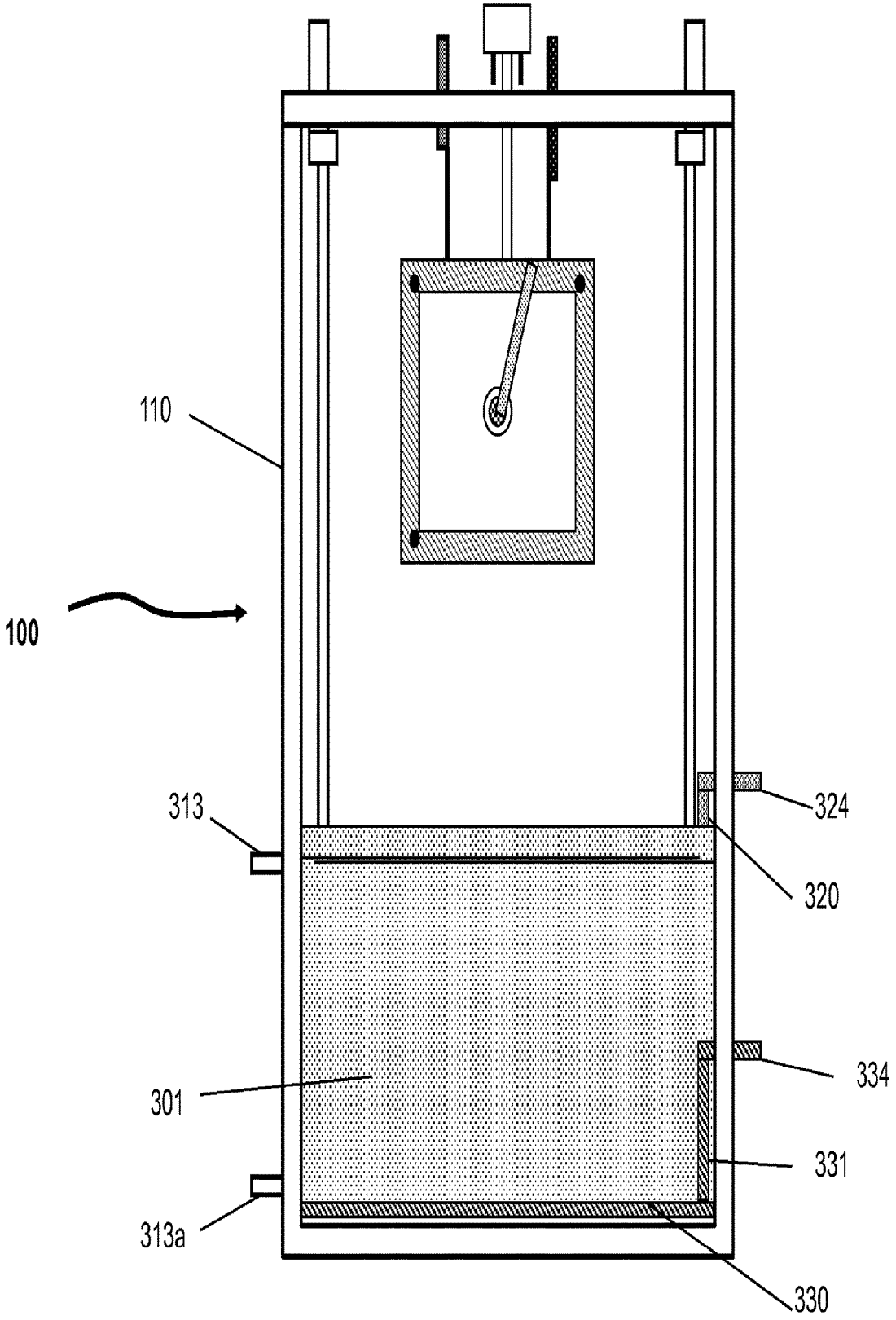

FIG. 3b A schematic illustration of the electric terminals and leads for the discharging assembly and the inlet and outlet for air to the oxygen cathodes that are positioned through the sides of the cell container.

Figure 4:
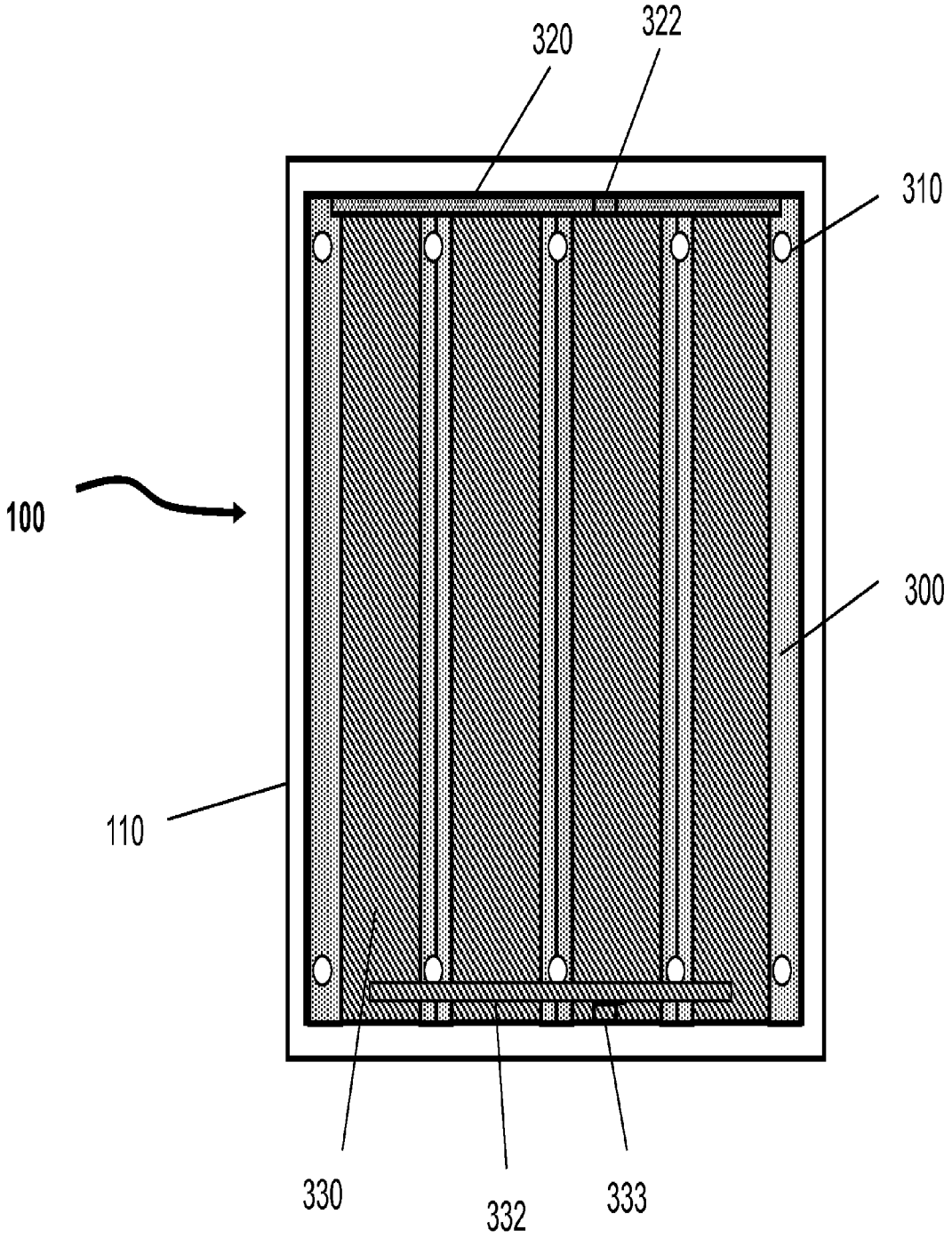

FIG. 4 A schematic illustration of the elements and structure of the electrochemical cell from the plane and along the lines B-B in FIG. 1.

Figure 5:
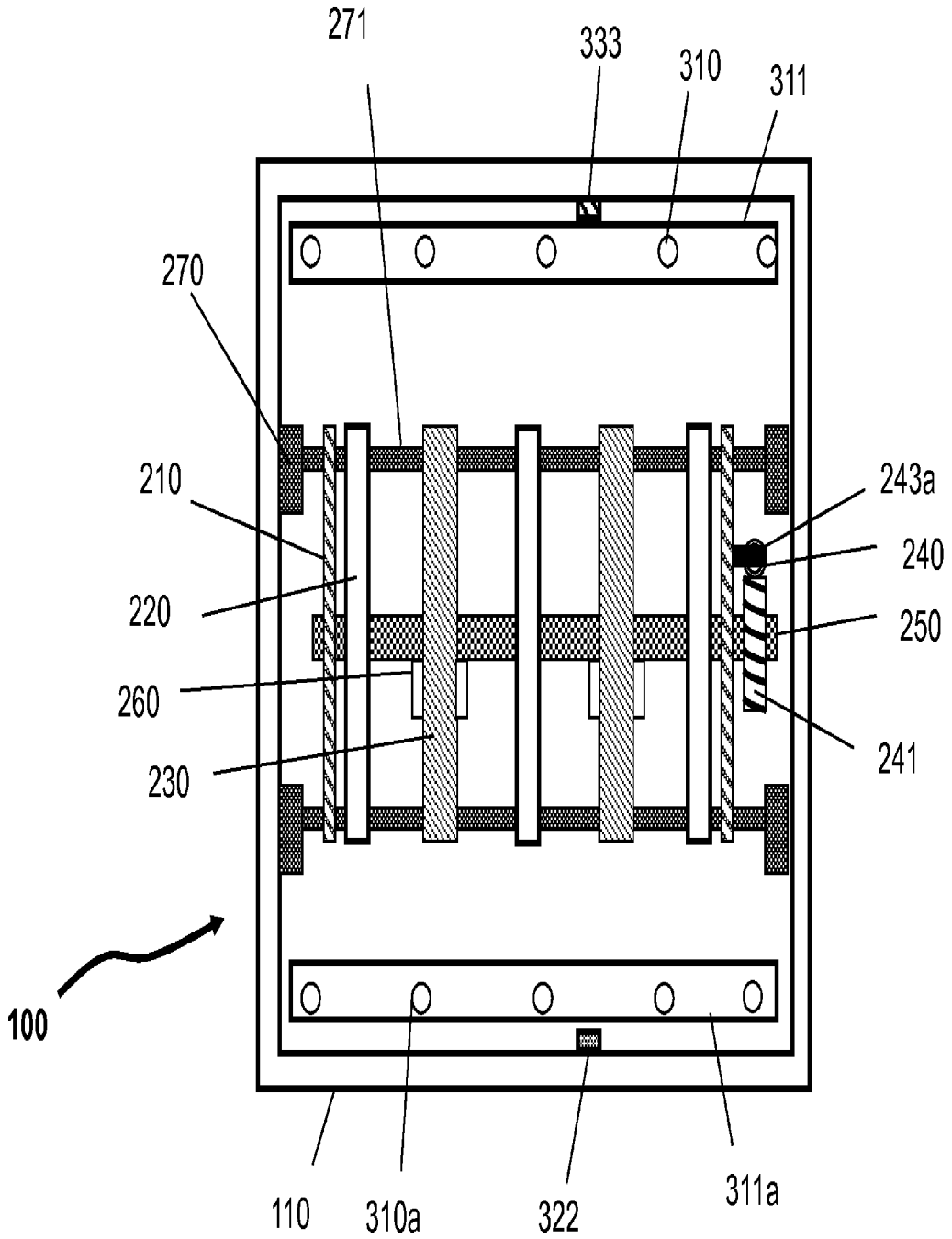

FIG. 5 A schematic illustration of the basic elements and structure of the electrochemical cell viewed from the plane and along the lines A-A in FIG. 1.

Figure 6:
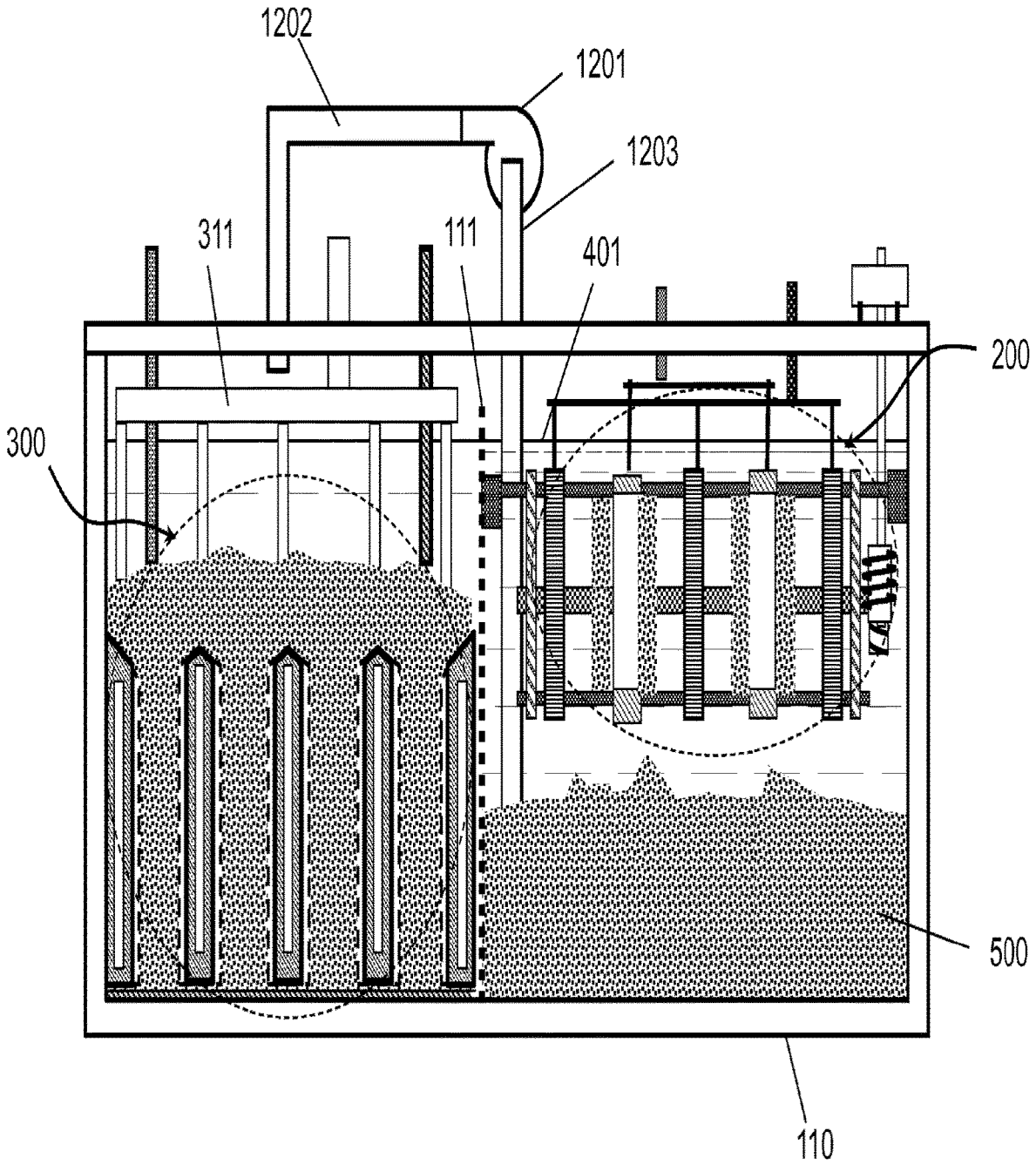

FIG. 6 A schematic illustration of an electrochemical cell in which the charging assembly is beside of the discharging assembly in the same container.

Figure 7:
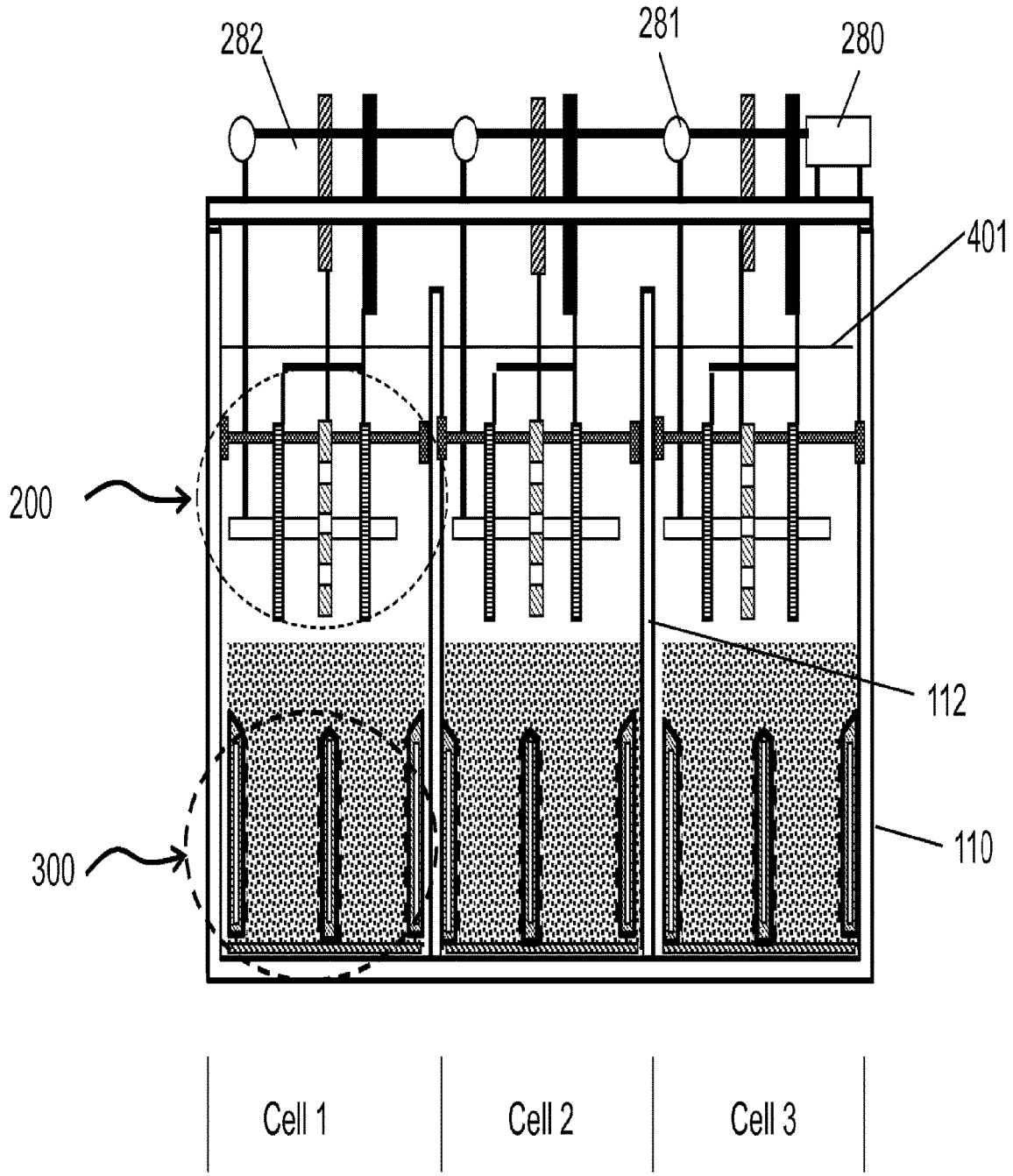

FIG. 7 A schematic illustration of the electrochemical system with multiple cells in one container; each cell has the basic elements and structure shown in FIG. 1.

Figure 8A:
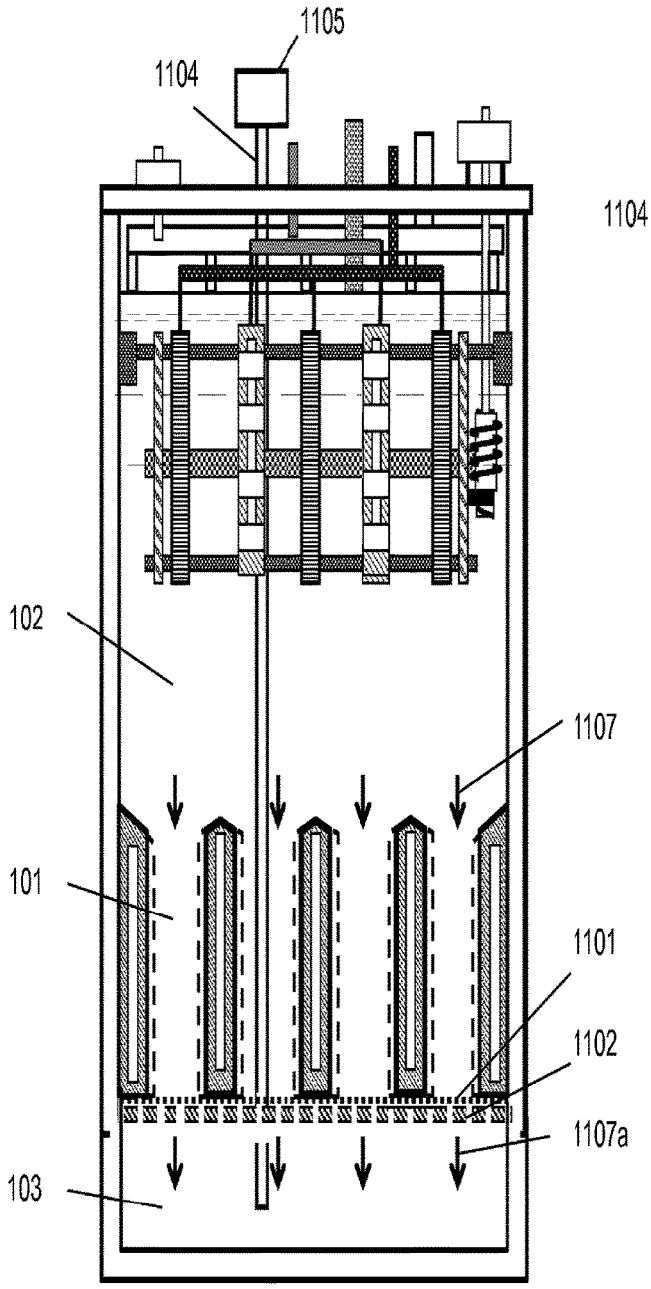
Figure 8B:
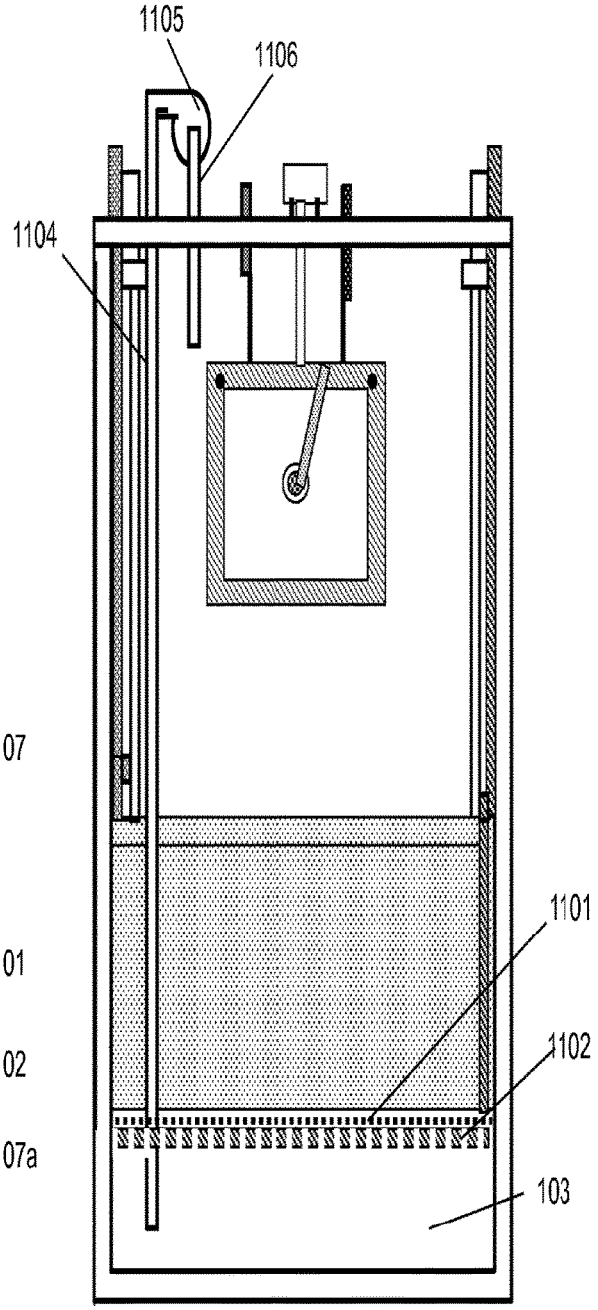

FIGS. 8a and 8b A schematic illustration of an electrochemical cell that has the same structure of that shown in FIG. 1 with a chamber beneath the discharging assembly, (8a) view from one side and (8b) view with a right angle from the side illustrated in (8a).

Figure 8C:
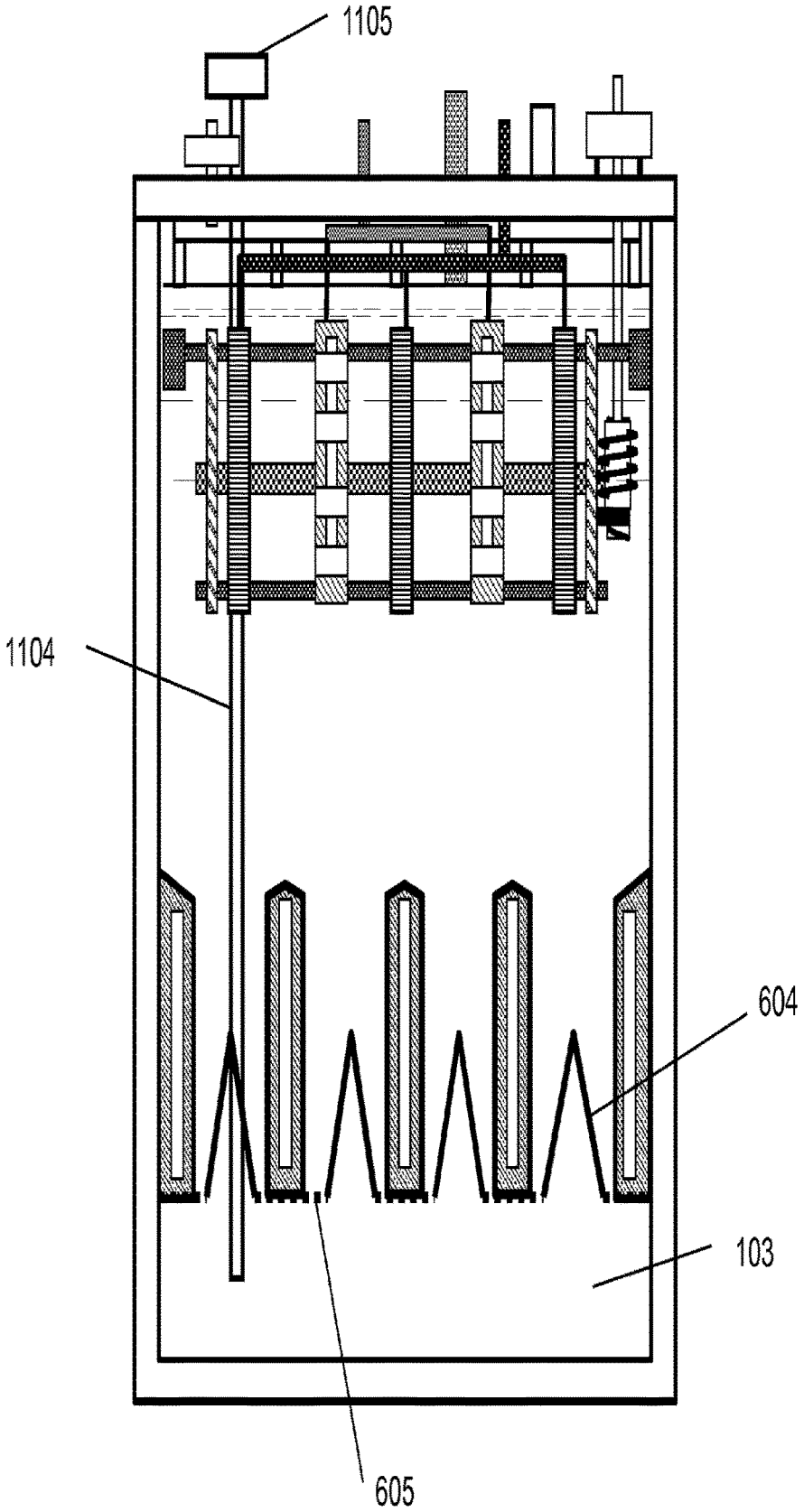
Figure 8D:
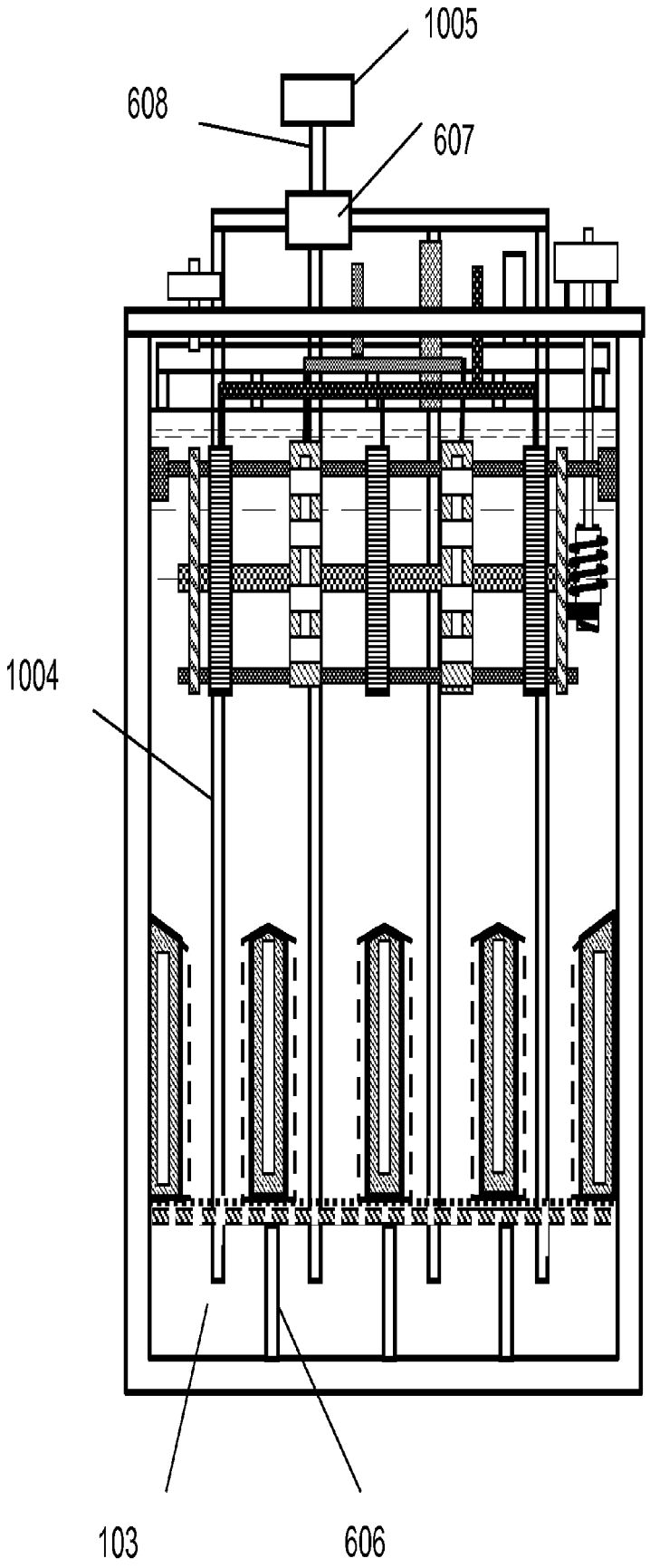

FIGS. 8c A schematic illustration of an embodiment with a baffle between the oxygen cathodes FIG. 8d, A schematic illustration of an embodiment with a plurality of chambers for electrolyte circulation through the metallic material through the space between individual pair of oxygen cathodes.

Figure 8E:
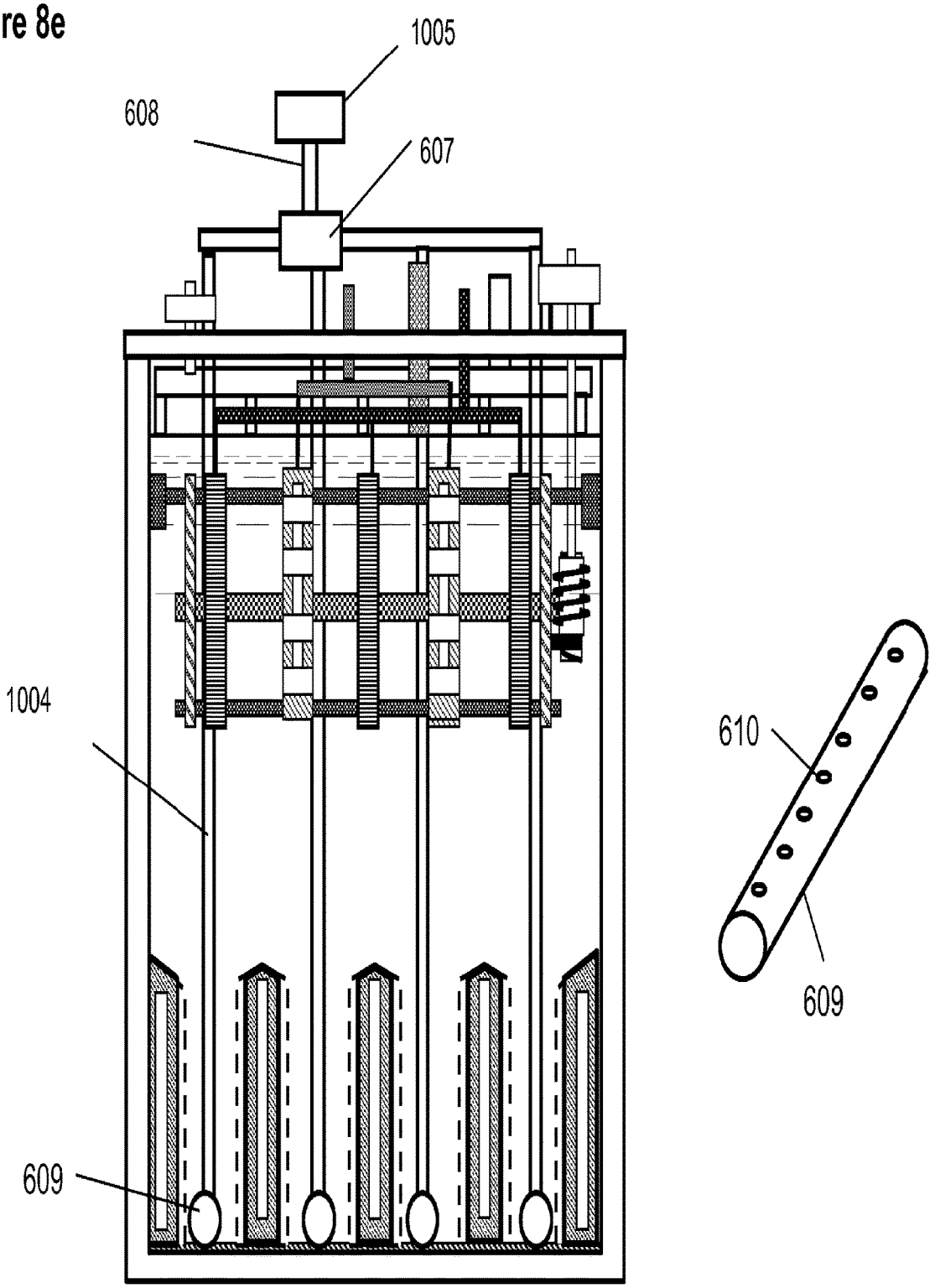

FIG. 8e A schematic illustration of an embodiment with tubes positioned between the oxygen cathodes; the tubes have a plurality of holes along the length for passing through electrolyte.

Figure 9A:
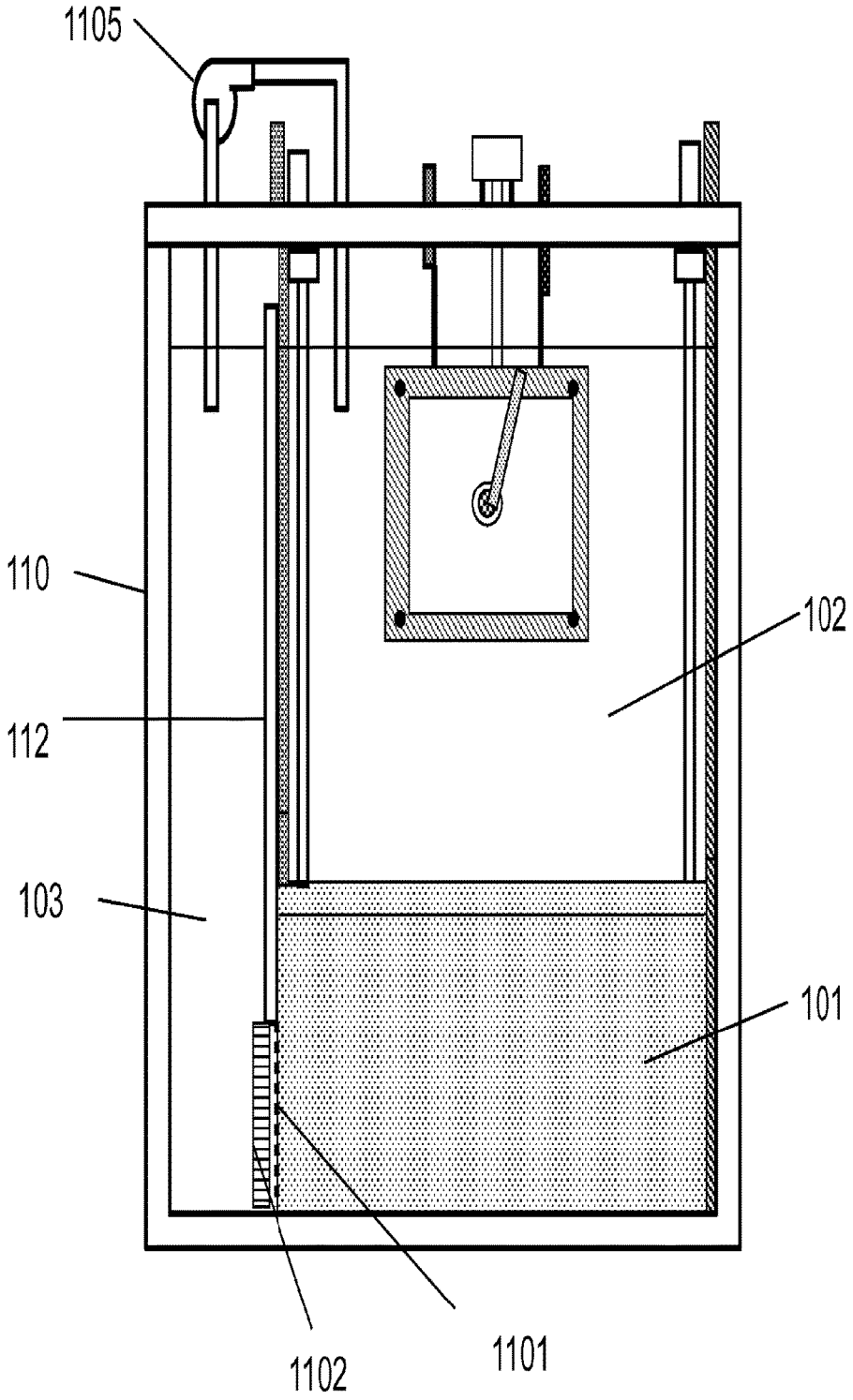

FIG. 9a A schematic illustration of an electrochemical cell that has a chamber beside the discharging assembly.

Figure 9B:
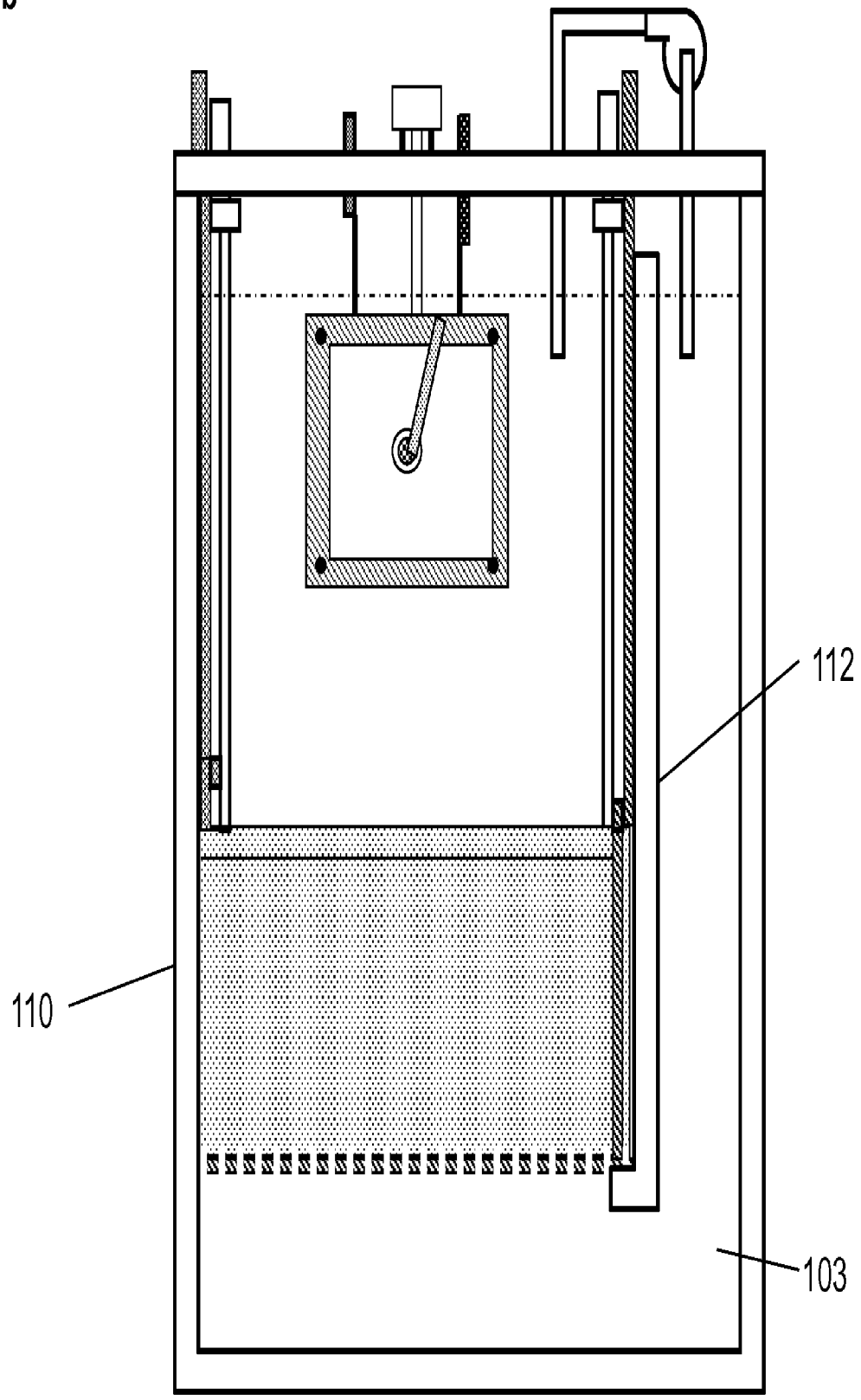

FIG. 9b A schematic illustration of an electrochemical cell that has a chamber beneath that is extended to beside the discharging assembly.

Figure 10:
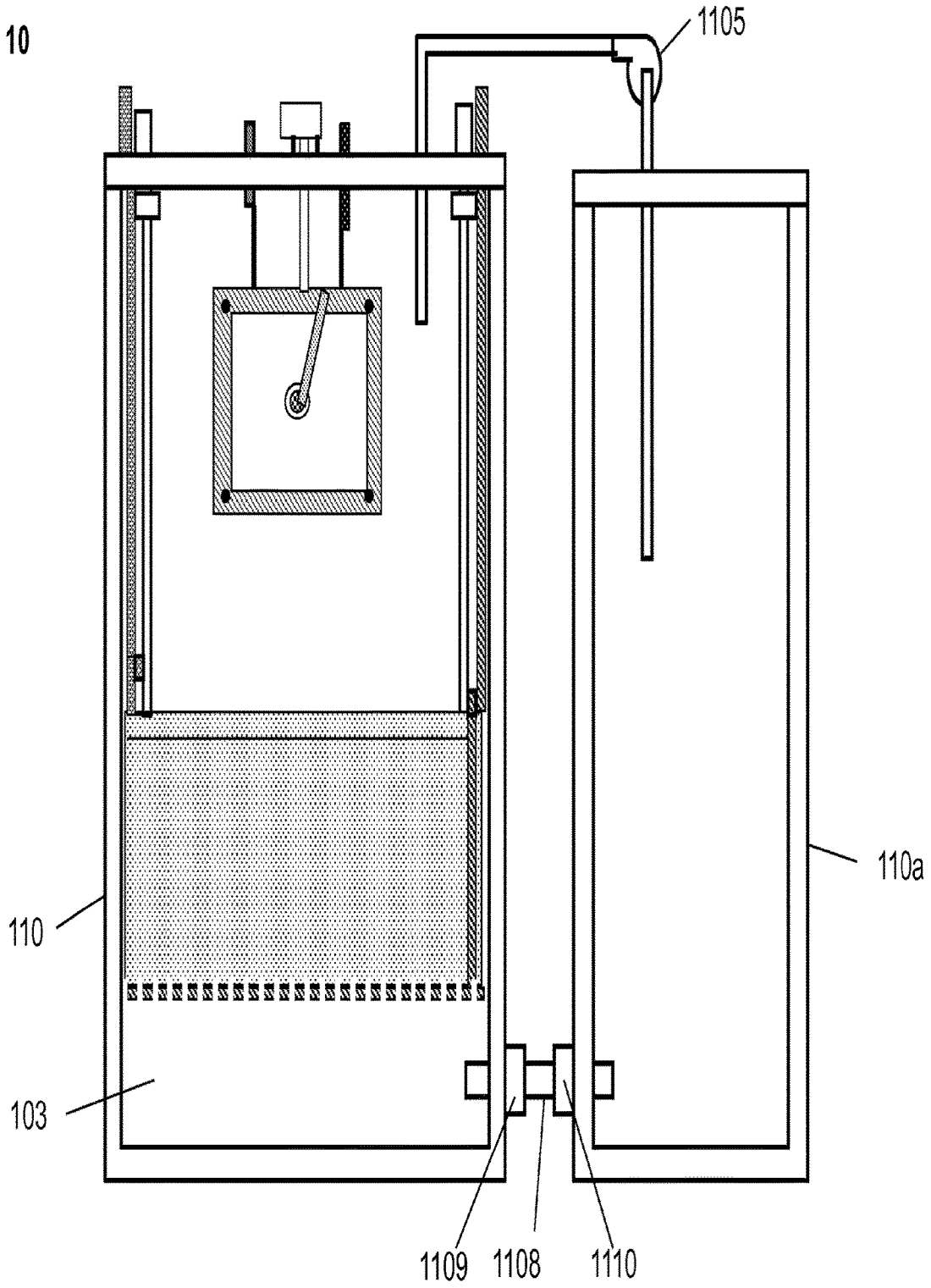

FIG. 10 A schematic illustration of the electrochemical cell shown in FIG. 8 having a separate tank for containing extra electrolyte.

Figure 11:
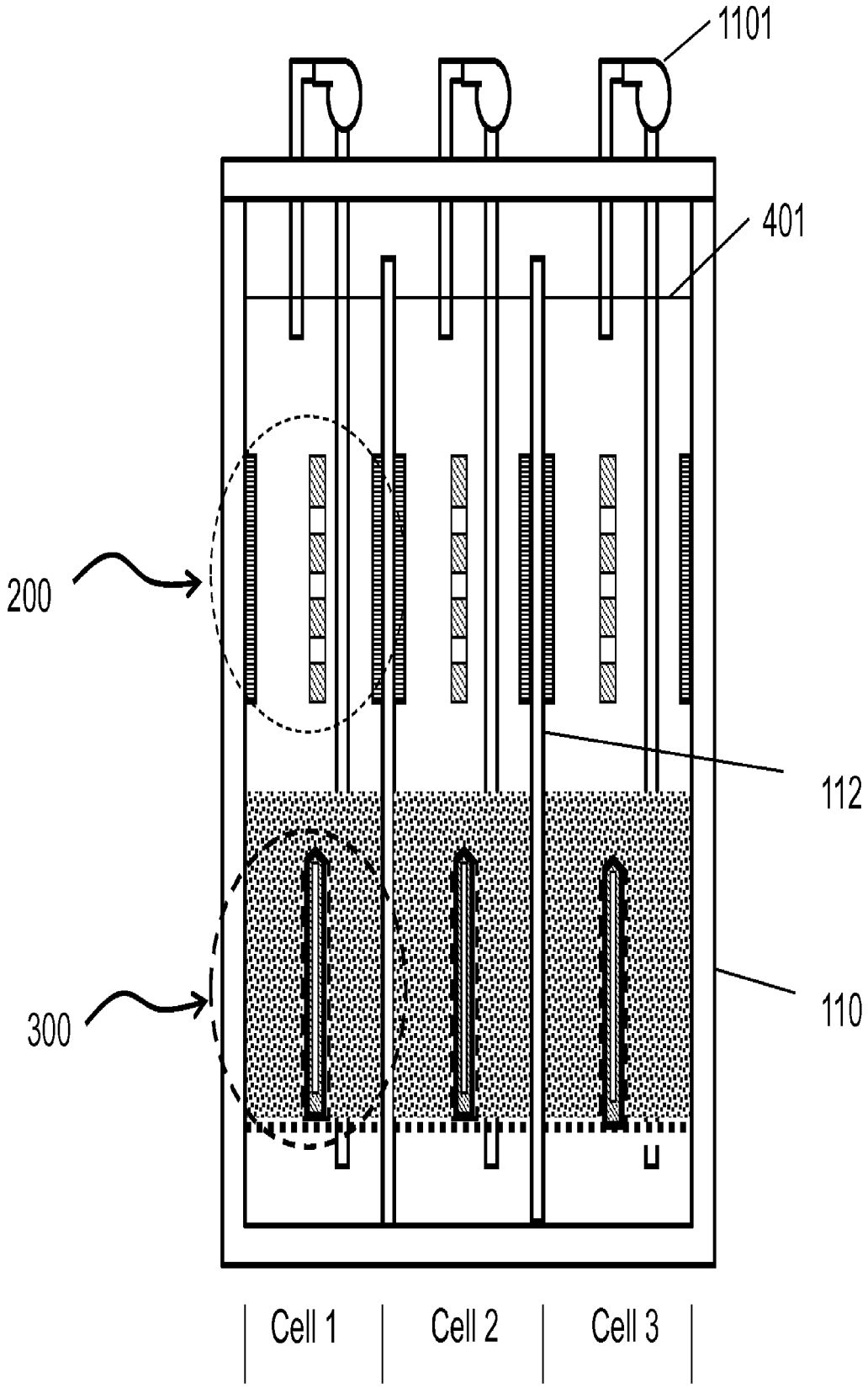

FIG. 11 A schematic illustrations of multiple cells in one container with a chamber beneath each cell; there are only one charging cathode and one oxygen electrode in each cell. (The various components, such as pipes, conducting elements motor etc that are illustrated in other figures such as FIG. 1 and FIG. 8 are omitted for clarity.)

Figure 12A:
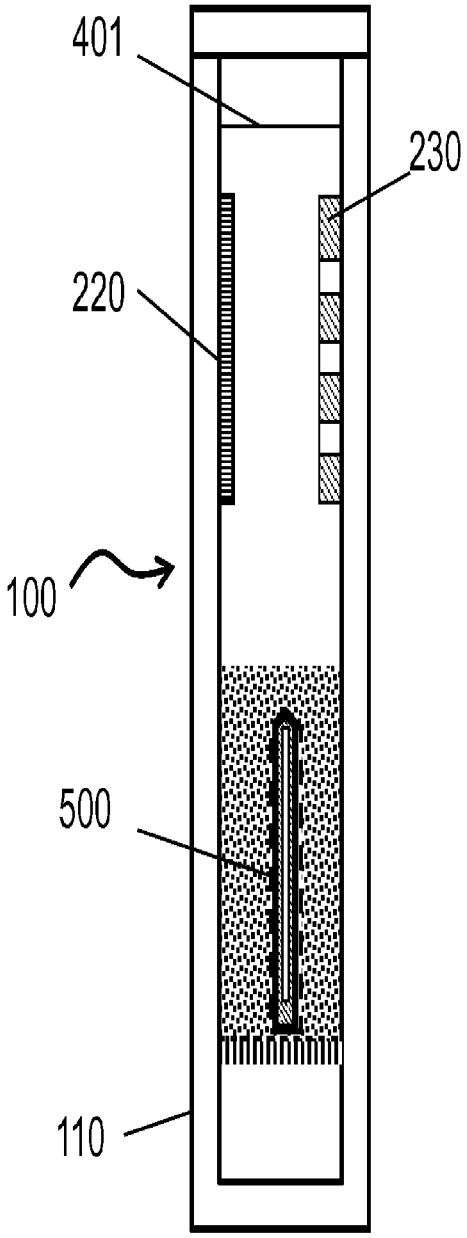
Figure 12B:
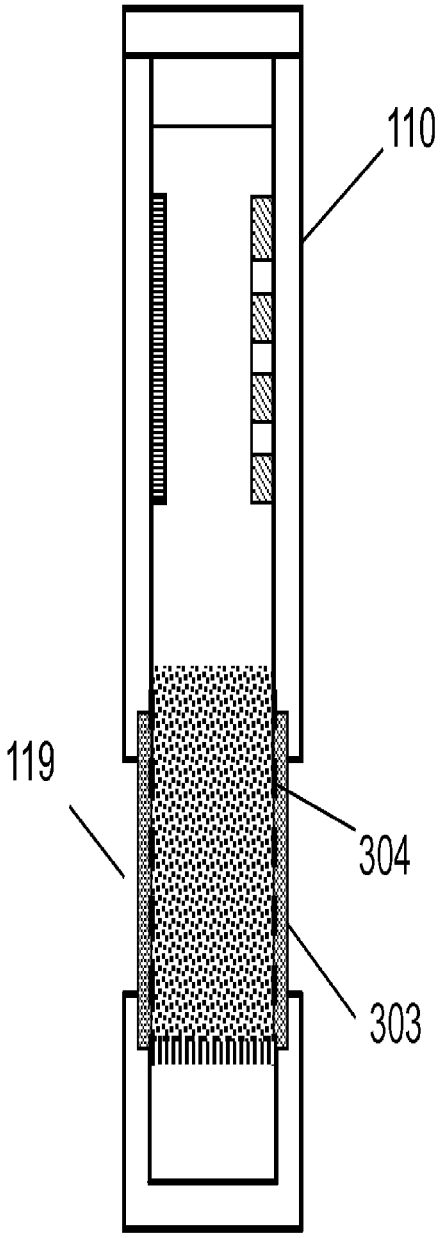

FIGS. 12a and 12b A schematic illustration of a cell with one oxygen electrode and one pair of charging electrodes in a single container (12a); and with one pair of charging electrodes and two oxygen electrodes mounted on the side of the cell container (12b).

Figure 13:
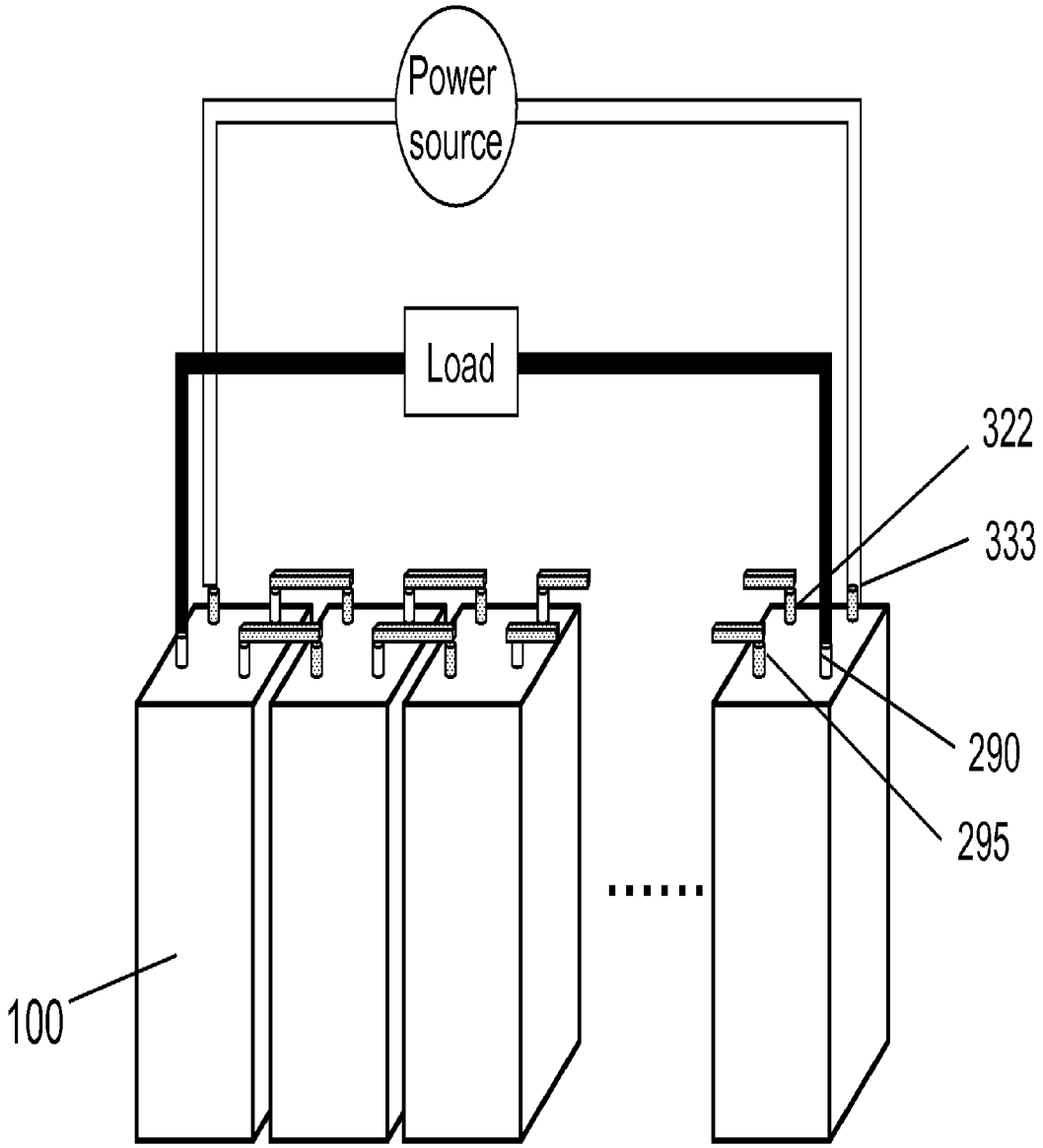

FIG. 13 A schematic illustration of an embodiment of the electrochemical system with a plurality of cells for energy storage and generation.

Figure 14A:
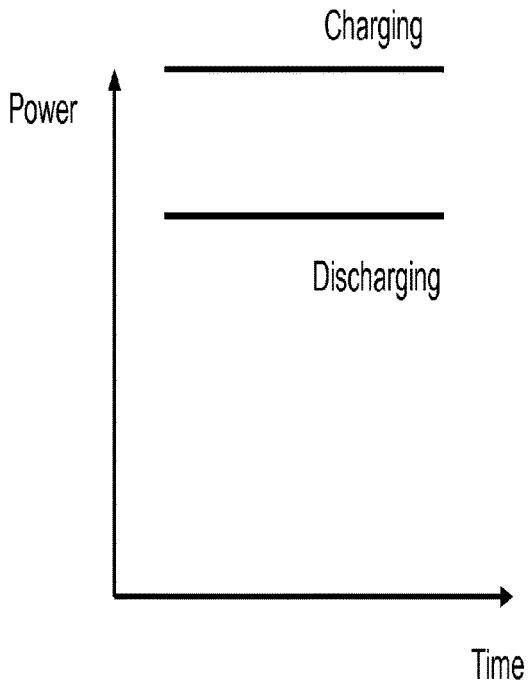
Figure 14B:
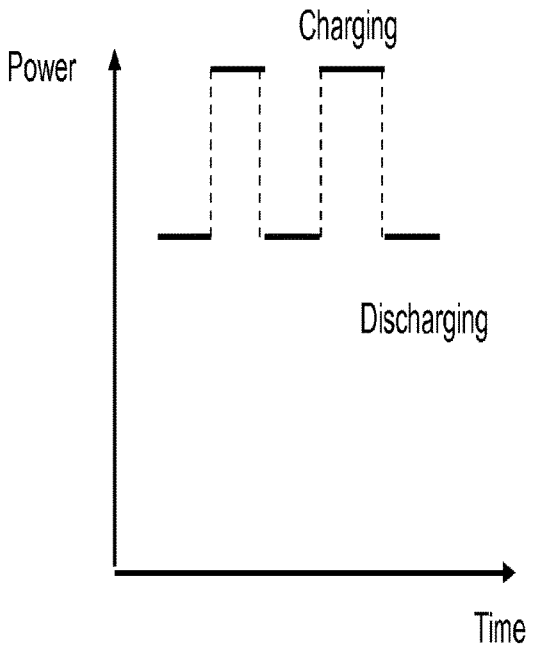

FIGS. 14a and 14b A schematic illustration of power profiles for (14a) concurrent charging and discharging and (14b) alternating charging and discharging.

Figure 15:
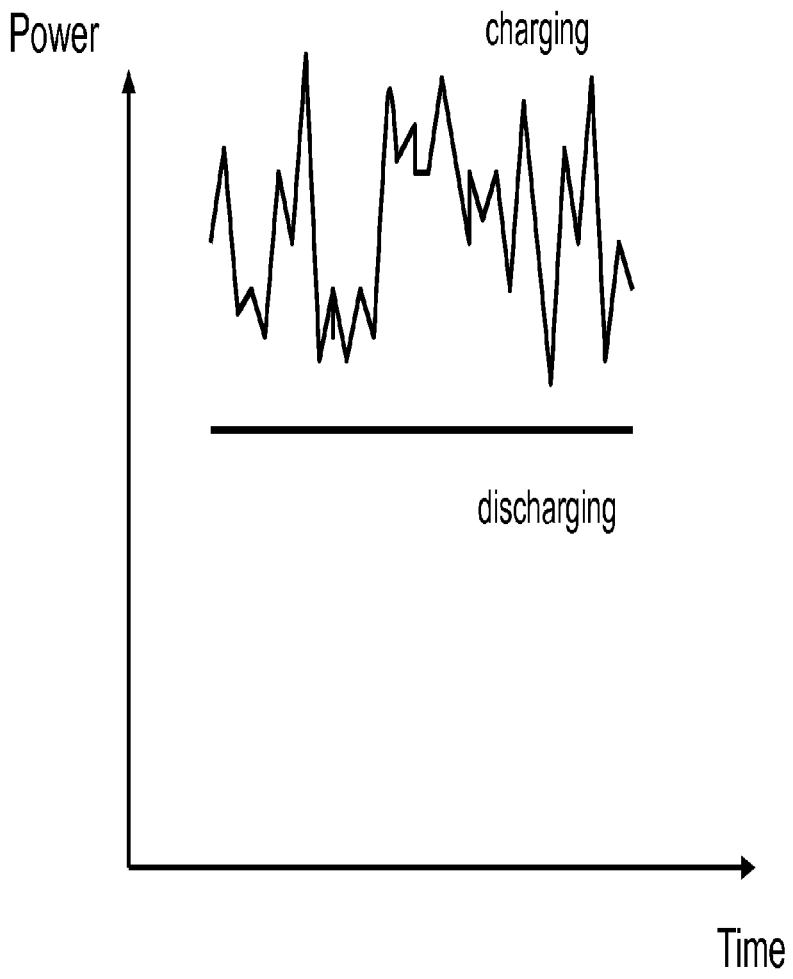

FIG. 15 A schematic illustration of power profiles of concurrent charging and discharging with a varying input power during charging and constant output power during discharging.

Figure 16A:
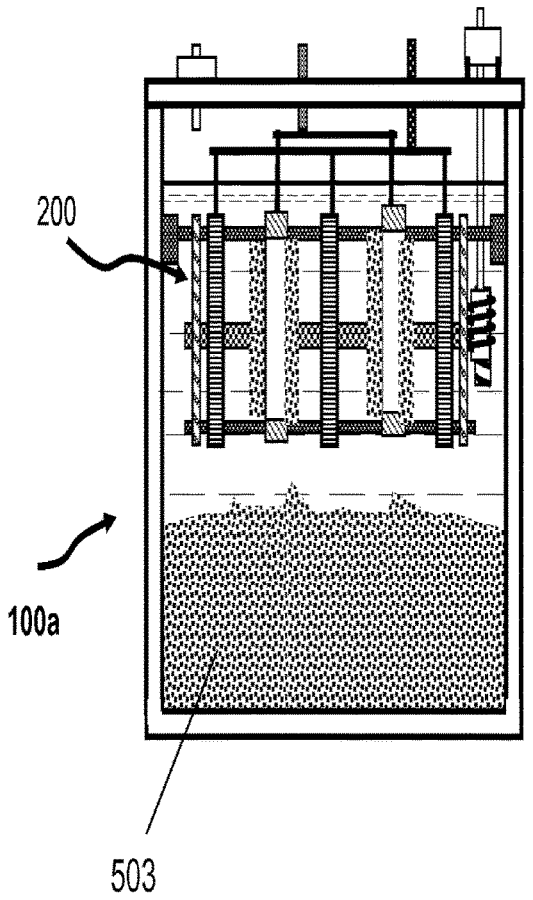
Figure 16B:
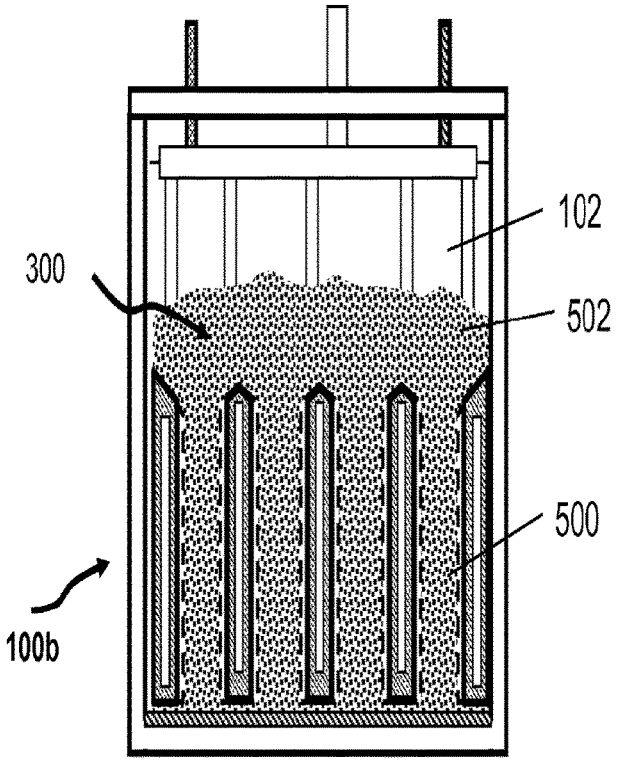

FIGS. 16a and 16b A schematic illustration of a cell containing the charging assembly, (16a) and a cell containing the discharging assemblies (16b).

Figure 16C:
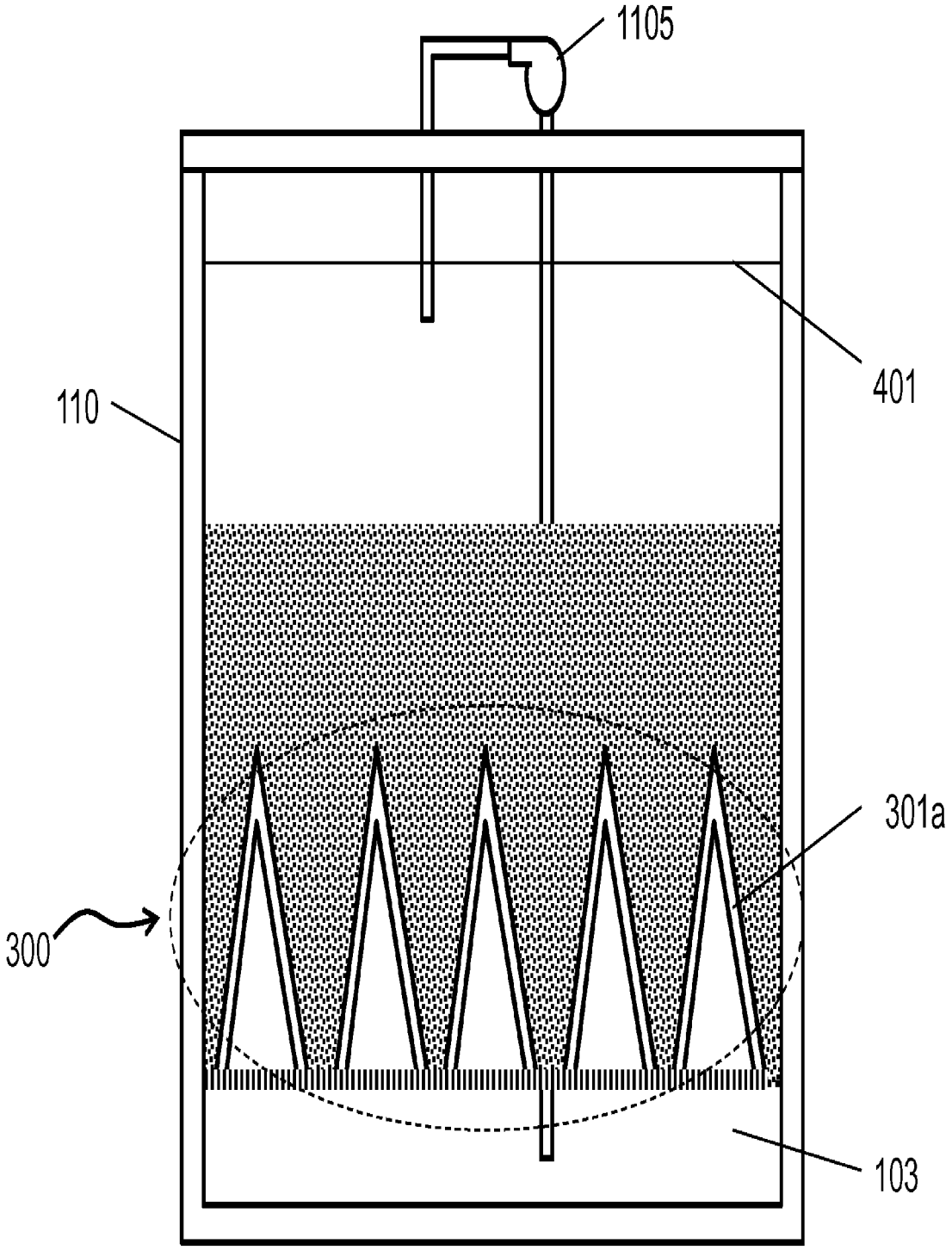

FIG. 16c A schematic illustration of a discharging cell in which there is a chamber beneath the charging assembly for electrolyte and the discharging oxygen cathodes are in a triangular shape.

Figure 17A:
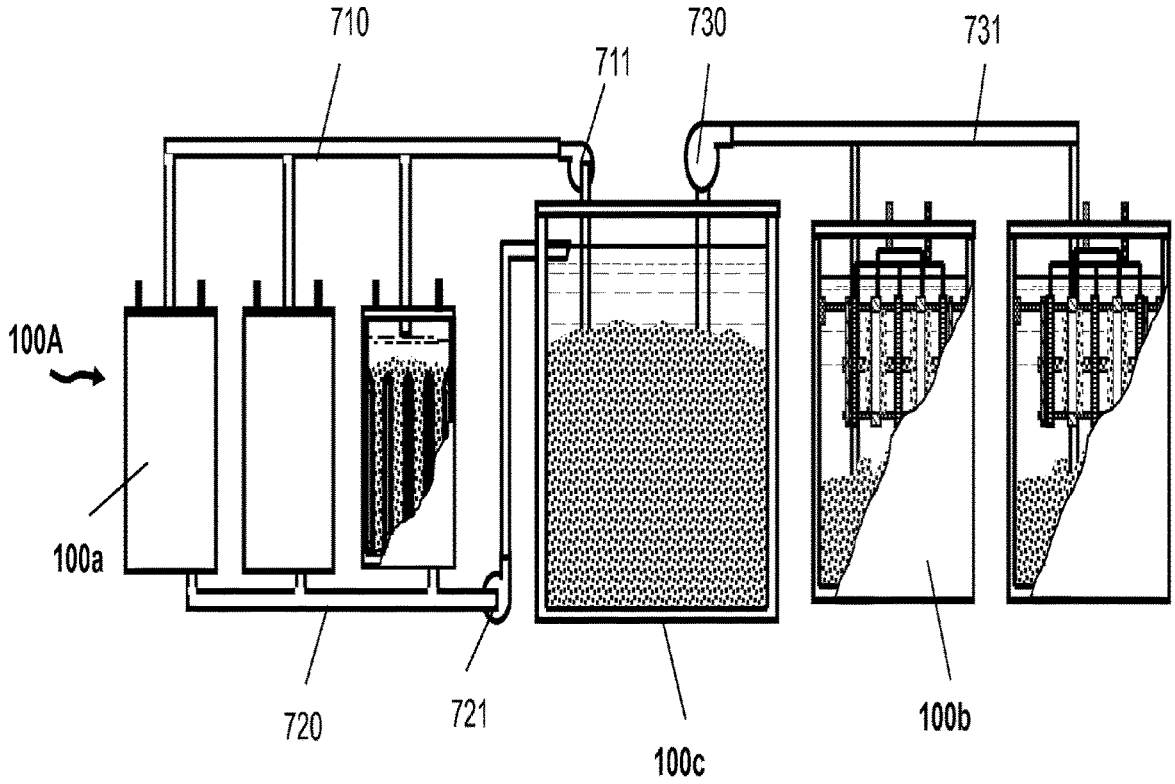
Figure 17B:
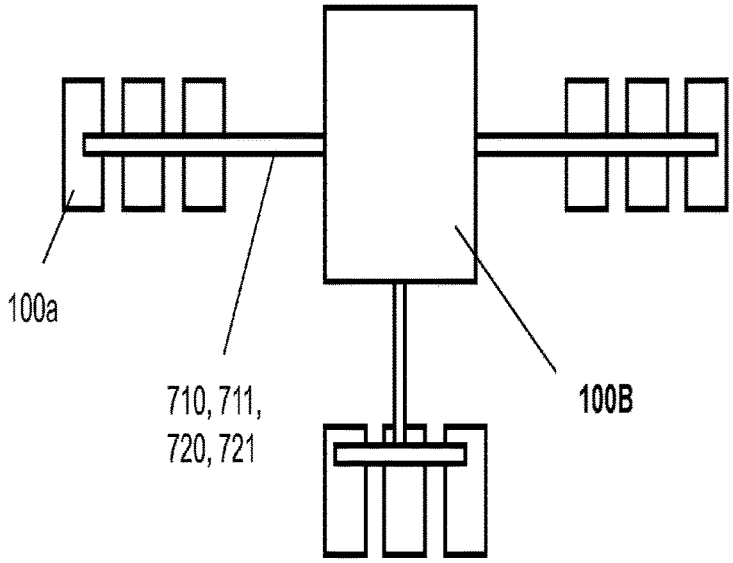

FIGS. 17a and 17b A schematic illustration of an embodiment of (17a) a set of discharging cells are integrated with a charging cell and (17b) multiple sets of discharging cells are integrated with a charging unit.

Figure 18:
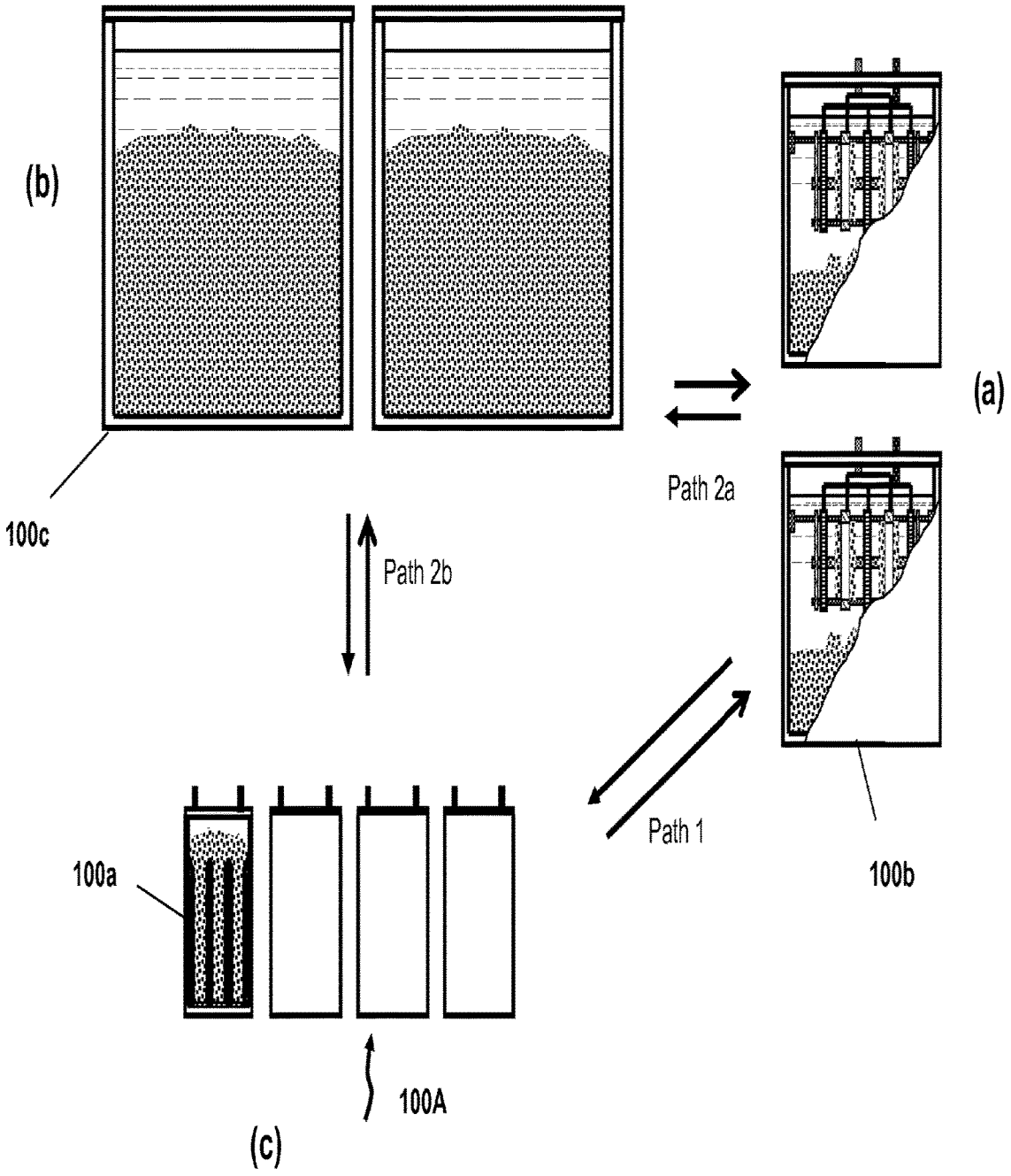

FIG. 18, (a), (b) and (c) A schematic illustration of an operation of the electrochemical cell system where the metal deposit is generated in the charging cells (a), stored in storage containers (b) which may be transported to the discharging cells (c) that are located in different places.

Figure 19:
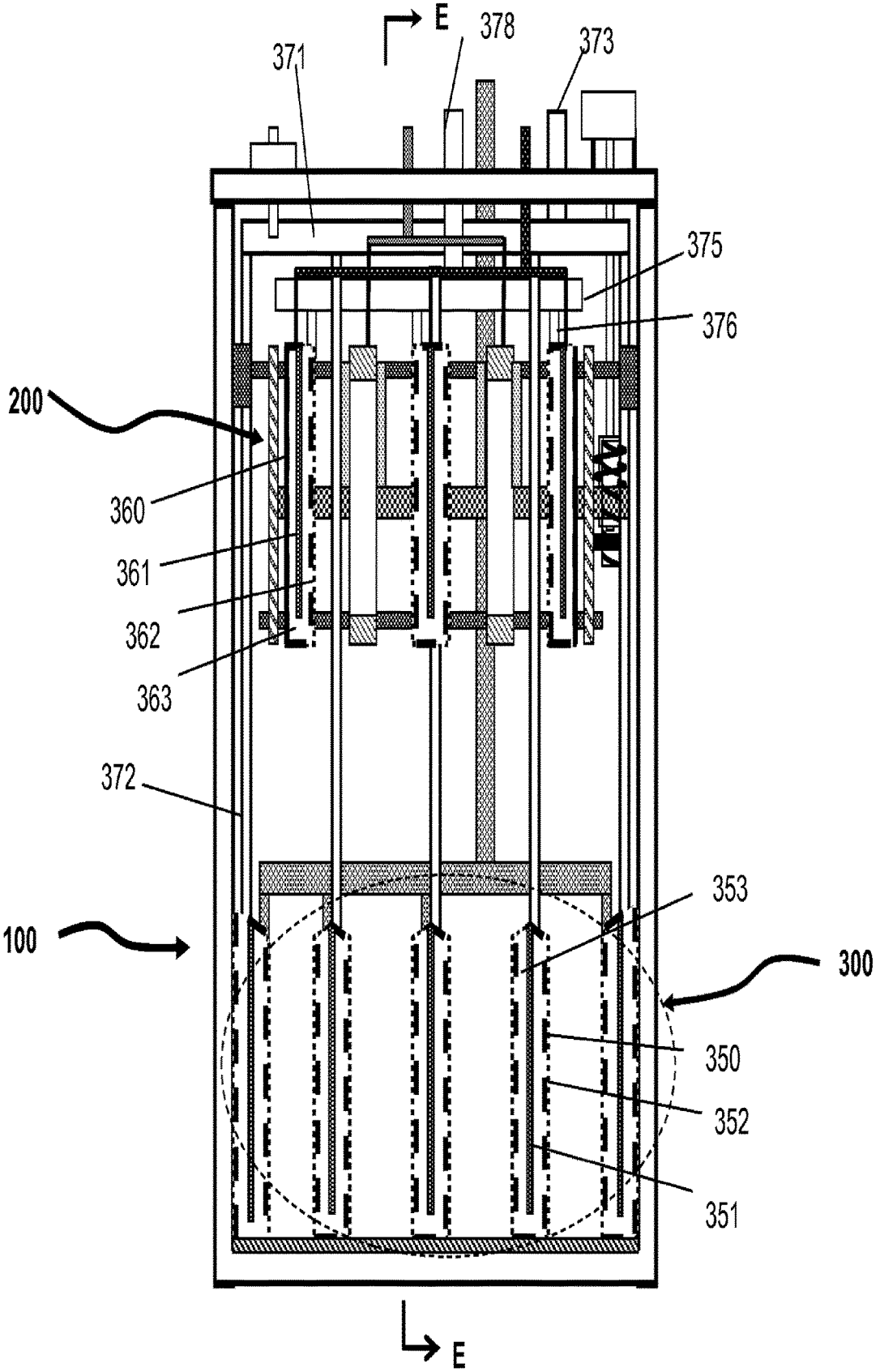

FIG. 19 A schematic illustration of the basic elements and structure electrochemical cell according to an embodiment of the present invention, in which the oxidant is in liquid form such as bromine for the positive electrodes.

Figure 20:
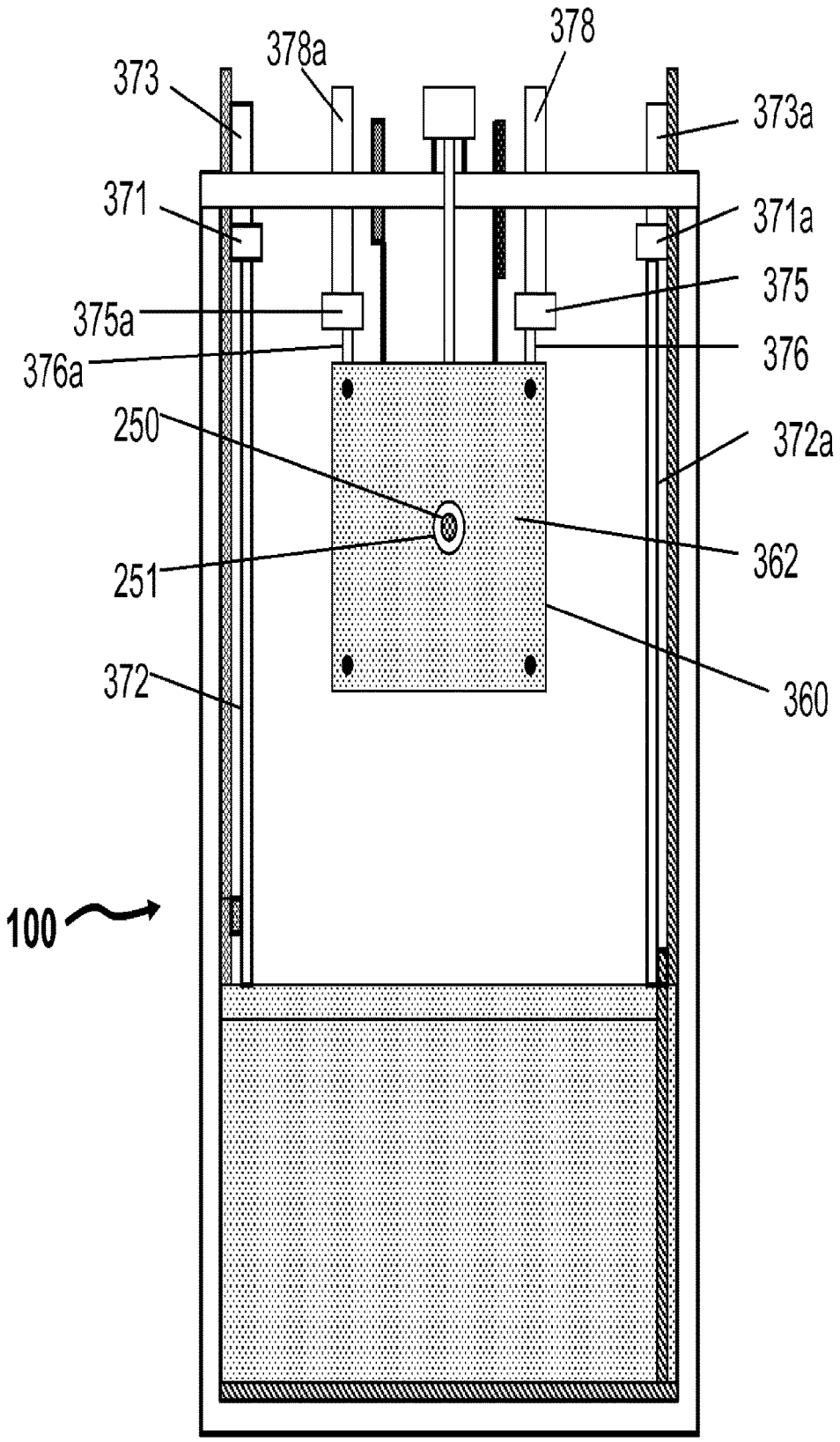

FIG. 20 A schematic illustration of the basic elements and structure of the electrochemical cell viewed from the plane and direction E-E as indicated in FIG. 19.

Figure 21:
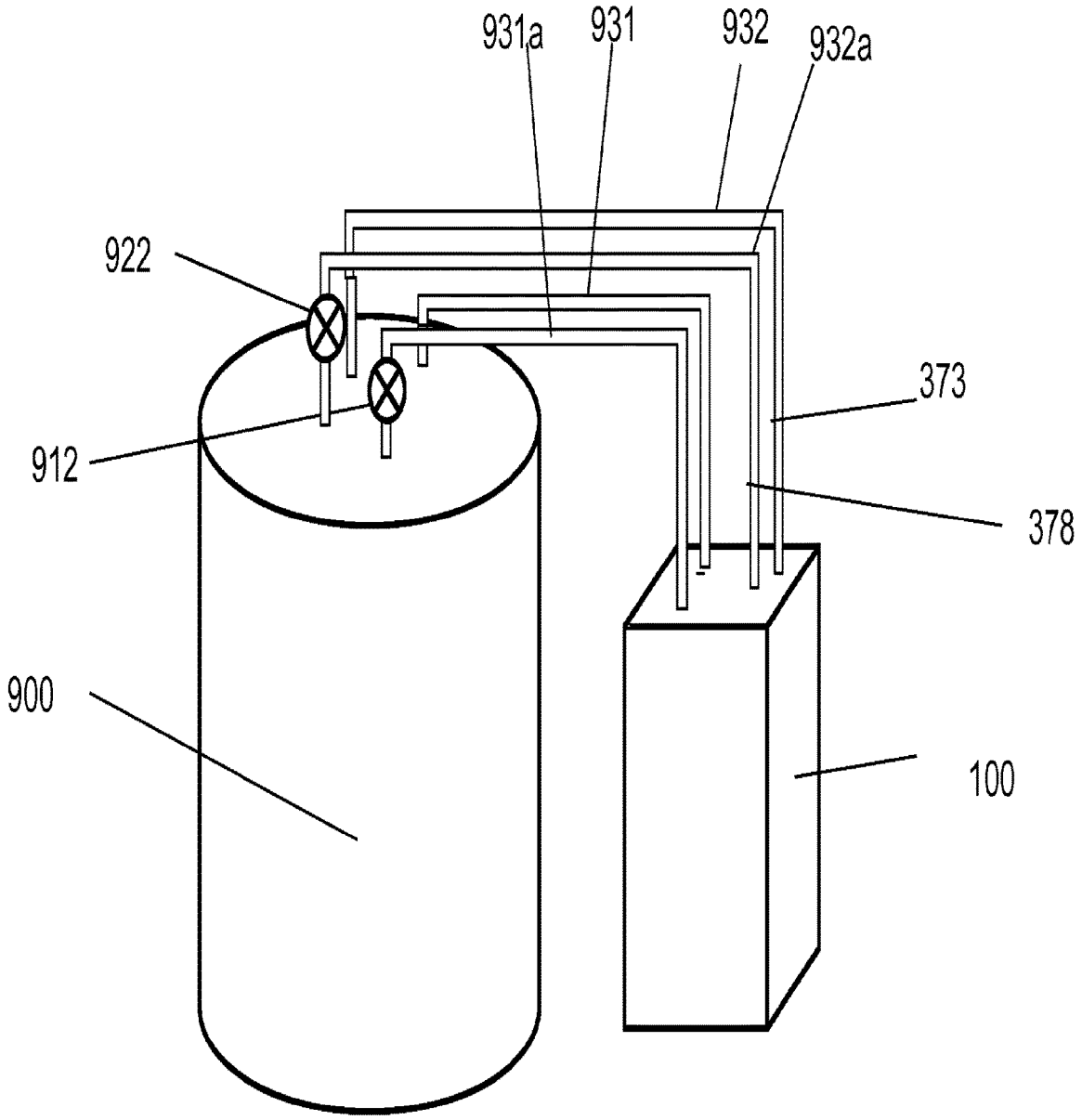

FIG. 21 A schematic illustration of an embodiment of the electrochemical system shown in FIG. 19 with an external tank for storing the liquid reactant that is circulated in and out of the electrochemical cell by pumps.

Figure 22:
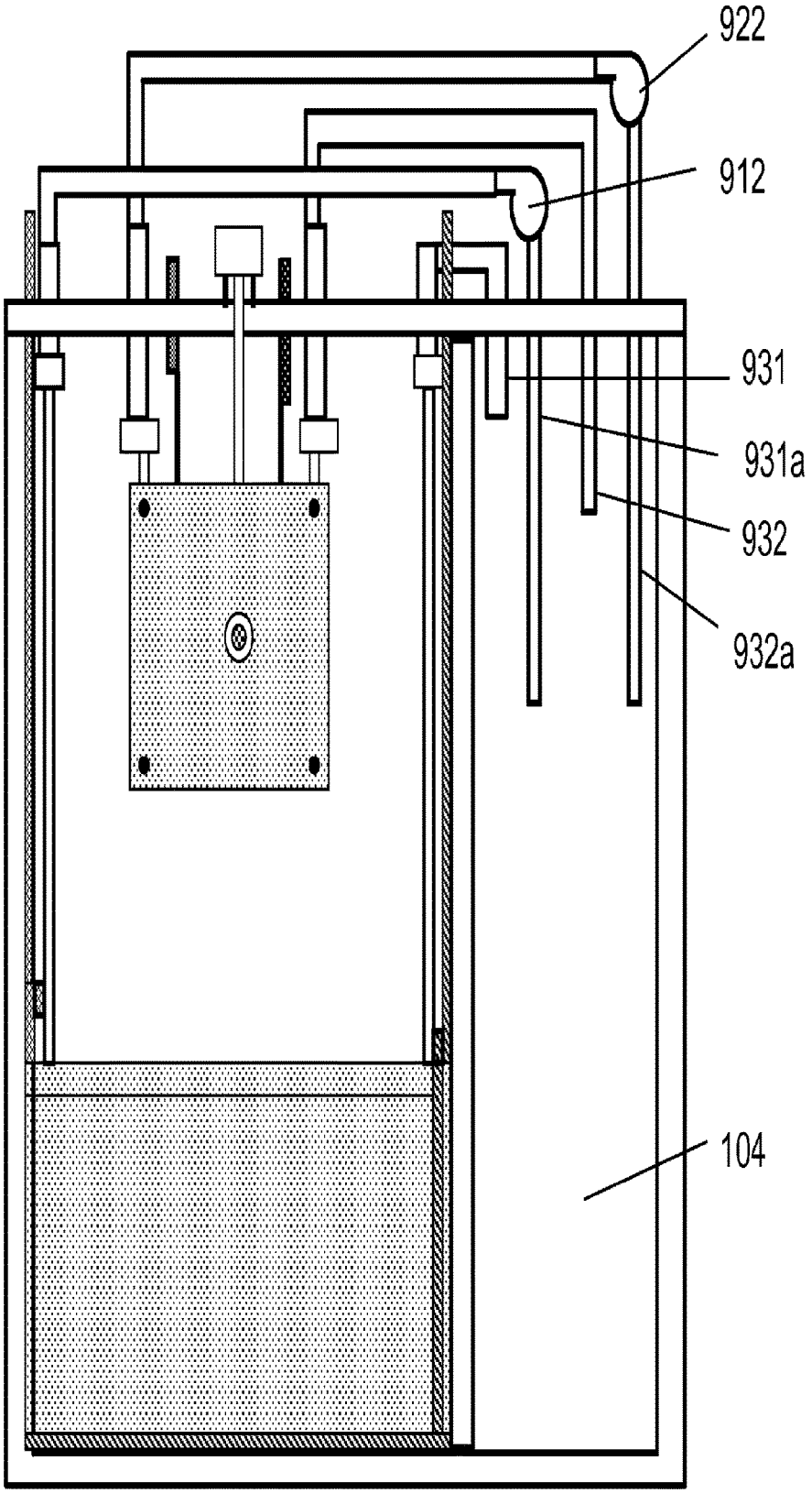

FIG. 22 A schematic illustration of an embodiment of the electrochemical system having a compartment in the cell container for containing the liquid reactant for reactions involved with the positive electrodes.

Figure 23:
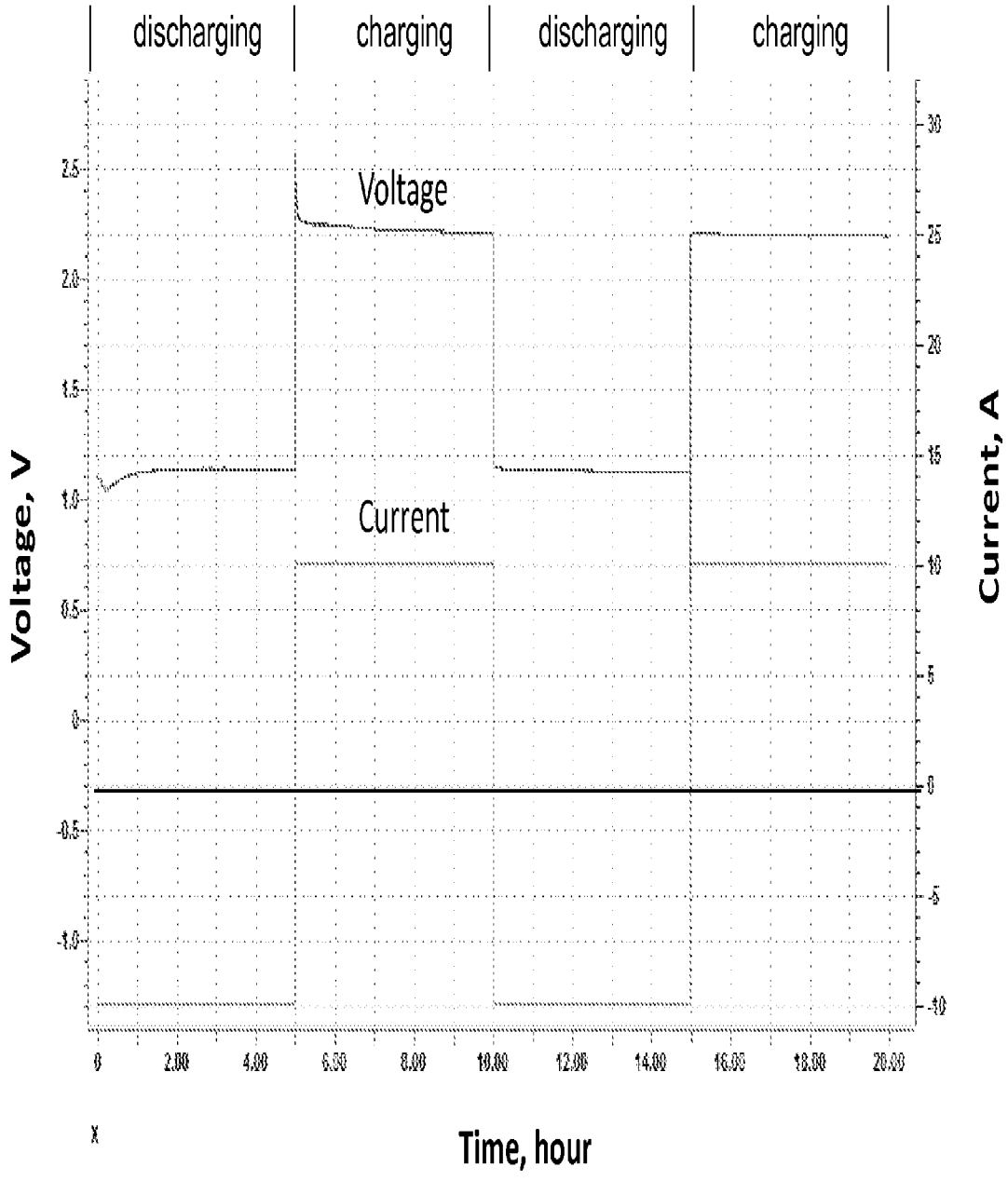

FIG. 23 Current and voltage as a function of time for the prototype test cell measured during charging and discharging.

SUMMARY OF INVENTION

The present invention provides an electrochemical system, apparatus and methods for storing electricity in metals. According to a general aspect of the invention, it is an electrochemical cell system comprising a charging assembly or device for metal deposition, a discharging assembly or device for metal dissolution, and a mean for containing a metal. The electrochemical system further comprises means of containment for the charging assembly, discharging assembly, electrolyte and metallic material. The charging and discharging assemblies can be contained several ways and can be operated for various types of charging and discharging functions involved in electrical energy storage.

In another general aspect of the present invention, it provides a method for generating and storing electricity comprising generating a metallic material in a charging assembly by electro-metal deposition, a storage facility for the metallic material, and dissolving the metallic material in discharging assembly to generate electricity. The method further comprising means for transport or movement of the metallic material and electrolyte, and means of containment for the charging assembly, discharging assembly, electrolyte and metallic material.

In one aspect of the invention, the discharging assembly of the electrochemical system comprises at least one cathode with the space adjacent to the cathode for containing metallic material as the anode. The cathode and anode form an electrode couple by which discharging processes occur. The space for containing the anode can also be described as the space below the at least one discharging cathode or the space amid the cathode and the interior surface of the housing or the space amid the cathodes if there are a plurality of cathodes.

In another aspect of the invention, the charging assembly of the electrochemical cell system consists of at least one anode and cathode couple for electro deposition of a metallic material on the surface of the cathodes, and a mechanism to dislodge or remove the deposited metallic material on the cathodes.

In another aspect of the invention, the electrochemical cell system comprises two sets of redox reactions, one set involving a metal and another involving a fluid or gaseous reactant. The oxidation and reduction reactions for the metal occur on the negative electrodes, which are the cathodes in the charging assembly and the anodes in the discharging assembly, and the oxidation and reduction reactions of a fluid or gaseous reactant occur on the positive electrodes, which are the anodes in the charging assembly and cathodes in the discharging assembly.

In one embodiment, a discharging assembly and a charging assembly are housed in the same body of electrolyte in a single container to form a cell. The discharging assembly can be located underneath of the charging assembly or on the side of the charging assembly. The metallic material formed from deposition in the charging assembly is transported or moved into the anode spaces or anode beds in the discharging assembly by gravity if the charging assembly is above the discharging assembly or by a mechanical means such as a pump if they located side by side. The discharged metal material is dissolved in the electrolyte which is transported or moved from the discharging assembly to the charging assembly through concentration homogenization of the electrolyte by diffusion and convection. A space or head room is above the discharging assembly for containing extra metallic material when the anode spaces in the discharging assembly are filled.

In another aspect, the system may further comprise aspects, for example, a chamber in proximity to the discharging assembly or a tube beneath the anode beds for electrolyte circulation through the anode beds between the oxygen cathodes, a stirring mechanism in the anodes beds to improve packing density and uniformity of the metallic material, a baffle beneath the anode beds to help direct the metallic material toward the surface of the oxygen cathode.

In another embodiment, a plurality of discharging assemblies and a plurality of charging assemblies are contained in a plurality of compartments in a container to form a plurality of cells in the container.

In another embodiment the charging and discharging assemblies are located in separate containers forming a charging cell and a discharging cell. The metallic material and electrolyte are transported between the charging and discharging cells by a mechanical means such as pumps. The charging cell or cells may be located in proximity and are connected with discharging cell or cells with pipes; alternatively the charging cells and discharging cells may be disconnectedly located in different locations. The independent discharging cells can be used in applications as motive or back-up power sources. The independent charging cells can be located in places close to the sources of primary energy such wind and solar. The deposited metallic materials generated in the charging cells and be contained and shipped to the discharging cells located in different places.

As a further embodiment, in addition to separated charging and discharging cells, metallic material and electrolyte can also be contained in separated containers or reservoirs, which contain no electrodes and thus are beneficial for low cost storage and transport.

In a preferred embodiment of the present invention, the metal is zinc for the reactions on the negative electrodes and the reactant is oxygen for the reactions on the positive electrodes. The functionality of this embodiment had been experimentally demonstrated, the result being disclosed in this document.

In one aspect of the preferred embodiment, the oxygen cathode is a structure that has a cavity inside for passing air or an oxygen containing gas through and its exterior surfaces exposed in the electrolyte. The oxygen cathode can be independently removed from the discharging assembly. The structure may consist of a frame covered with an oxygen membrane electrode to form a cavity defined by the frame and the membrane electrodes, and an inlet and outlet for the passage of oxygen or air in and out of the cavity. The shape of the oxygen cathodes may be planar, circular, triangular, oval etc.

In another aspect of the proffered embodiment, the reactant for the redox reactions on the positive electrodes may be associated with iron, cerium, bromine, chlorine, chromium, vanadium and other elements, of which the redox reaction has a potential positive to that of zinc.

In another aspect of the invention, the electrochemical system is a regenerative metal fuel cell in which the metallic material, as the fuel, generated from electro deposition in the charging assembly, is loaded (or fueled, or fed, or moved) into the spaces between the positive electrodes of the discharging assembly and the discharged material is carried out the discharging assembly through diffusion and convection.

In another aspect of the invention, the electrochemical system is like a flow battery in which the reactions for the positive electrodes involve a redox couple in a fluid or gaseous form that flow through the positive electrodes of the charging and discharging assemblies.

In further aspect of the invention, the electrochemical system is like a generator, or a reactor or a plant capable of generating electricity continuously and on demand by feeding materials through and the discharged material can be regenerated in the same system which results in energy storage.

The present invention in essence is about storing electricity in metallic materials that are not bound in the electrode structures like battery in which the active materials are permanently fixed in the structures of electrodes. The basic principle of the invention has a general applicability allowing for designing electrochemical energy storage systems with different chemistries, cell structures and operations. It has many advantages over other energy storage technologies for many potential applications.

The electrochemical system of the present invention, due to its inherent advantages of using metallic materials for electricity storage, may be used for various energy storage applications that are not feasible with batteries. One particular feature of the present invention that is different from conventional batteries is that the system may be used as an electrical energy storage and power source at the same time such that it may be used to provide a continuous and stable electrical power in a non-stopping manner. Since the cells of the electrochemical system can contain active material outside of the structures of electrodes, the capacity of energy storage using the system can be flexibly varied at low costs. Also, the embodiment with separate charging and discharging facilities may be used for applications with distributed power sources. Furthermore, storage of only metallic materials but not the electrodes and other components in simple plastic containers may allow electricity storage for long terms at low cost.

DETAILED DESCRIPTION

An exemplary embodiment of the electrochemical cell according to the principles of the present invention uses oxidation and reduction of oxygen in the air and of a metal as the electrochemical reaction couple, of which the basic elements and structure are illustrated in FIGS. 1 et al to FIG. 5. FIG. 1a is a schematic illustration of the electrochemical cell without electrolyte and metal. FIG. 2a is a schematic illustration of the electrochemical cell shown in FIGS. 1a having electrolyte and deposited metal materials. FIGS. 3a, 4 and 5 are the schematic illustrations viewed from different cross sectional planes and directions indicated in FIG. 1a.

As shown in FIGS. 1a and 2a the electrochemical cell 100 includes a charging assembly 200 (roughly outlined by the dashed line), a discharging assembly 300 (roughly outlined by the dashed line), an electrolyte 400, a container 110 and a number of auxiliary components which will be described in the following paragraphs.

The charging assembly 200 is located on the top section of the container 110 above the discharging assembly. The charging assembly is in a space 102 (second space) above the discharging assembly. The charging assembly consists of at least one or a plurality of charging cathodes 230 and anodes 220, (only two cathodes and three anodes are illustrated in the figures for simplicity). The charging cathodes and anodes are appropriately spaced to match to the layout of the discharging assembly 300 which will be described further below. The cathodes and anodes of the charging assembly are physically secured on the horizontal bars 271 and 272. Bar 271 is secured onto the container 110 through an attachment fixture 270, for example and not limited to a screw or aperture. The cathodes and anodes may alternatively be mounted directly on the cell container 110. The cathodes comprise of a conductive material 231, for example and not limited to magnesium, that is stable in the electrolyte and has low adhesion to the deposited metallic material. The edges of the cathodes are covered by an insulating material 232, for example and not limited to polymeric materials, to prevent metal deposition on the edges. As a variation, the cathode may comprise a plurality of discrete active surface areas as illustrated in FIG. 2b for generating discrete metal deposits. FIG. 2c and d is an illustration of an example of such a cathode with discrete deposition areas 231 separated by insulating material 232.

In the embodiment illustrated in FIG. 1a, the layout of the electrodes of the charging assembly is in parallel to the electrodes of the discharging assembly. Alternatively, it may be structured such that the electrodes of the charging assembly are at perpendicular or at some other angles relative to the electrodes of the discharging assembly.

The mechanism for removing the deposited metallic material comprises wipers 260 mounted on a shaft 250 which is horizontally positioned with end two plates 210 and 210a through the middle of the charging assembly. The rotating motion of the shaft 250 is enabled with a motor 280 through a worm gear mechanism having worm gear elements 240, gears 241, gear shaft 242 and a support base fixture 243 as illustrated in FIG. 1b. Gear 241 is mounted on shaft 250 and gear 240 on a fixture 243 mounted on the end plate 210. The shaft 250 is preferably not in physical contact with the cathodes and anodes to minimize frictional resistance; the holes in the middle of the cathodes and anodes are larger than the diameter of the shaft. Alternatively, instead of rotating wipers, wipers that either moving horizontally or vertically may be used for dislodging the metal deposits from the cathodes surfaces. As a further alternative, the cathodes can be moved relative to the wipers that are fixed. Further alternative embodiments may include other mechanisms such as shaking or vibration the charging cathodes for removing the metal deposits.

As an alternative embodiment, the cathode and anode pairs of the charging assembly can be in a cylindrical form as illustrated in FIG. 2e. For the electrode pair 1000, the cylindrical cathode 1012 with current lead 1014 is outside of the cylindrical anode 1011 with current lead 1013. In operation, the metal deposits can be periodically removed with wiper 1015. As in the case of planer shape of charging cathodes, the cylindrical form of charging cathodes can also have discrete active surface areas for metal deposition.

During charging operation the metal in the electrolyte is reduced on the surfaces of the cathodes forming metal deposit 501 as illustrated at FIG. 2a. As the deposits grow on the cathode surface, they are periodically dislodged by wipers 260 from the surfaces and transported by gravity downward into first space 101 (anode beds) between the oxygen cathodes of the discharging assembly 300 underneath the charging assembly. The metal deposits may pile up into second space 102 to variable heights above of the discharging assembly after the first space is filled. The first space may also be described as that below the top edges of the oxygen cathodes or that amid of the oxygen cathodes and the interior surface of the container for the case where the shape of the oxygen cathodes is non-planar as shown in FIG. 1d.

The electrical current of the cathodes of the charging assembly is conducted to terminal 290 via leads 291 of the cathodes and bus 292. The current of the anodes is conducted to terminal 295 via leads 296 of the anodes and bus 297. The portion of leads 291 that is immersed in electrolyte is covered with an insulating material 291a (shown in FIG. 2c and d), such as a polymer coating or film to prevent metal deposition on the leads.

For the embodiment shown in FIG. 1a, the discharging assembly 300, located beneath of the charging assembly comprises one or a plurality of oxygen cathodes 301 (discharging cathodes) with first space 101 for, as illustrated at FIGS. 1a and b, containing anodes 500 (discharging anodes) consisting of the deposited metallic material 501 fallen from the charging assembly. Above the anodes pile 502 in the second space is the metallic material in excess of that in the anode beds (first space). The current of the anodes is collected by anode current collectors 330 (see FIG. 1a), on the bottom of cell 100, and 331 (see FIG. 3) on the side of the anode beds and is conducted through a horizontal bus 332 and a lead 333 to terminal 334 outside of the cell on the top (see FIGS. 1a and 3). The anode current collectors can be made of copper or other metal alloys and may also vary in size and shape and be placed at different locations in the anode spaces. The current of the oxygen cathodes is conducted to terminal 323 on top of the container via electrical leads 321 of individual oxygen cathodes, bus 320 and lead 322. All surface areas of the current conducting elements for the cathodes, i.e. 320, 321, and 322, that are submerged in the electrolyte is covered with an insulating material or the insulating material to prevent possibility of contact between cathodes and the metallic material. Alternatively, the electrical leads of the discharging assembly may be connected to the terminals on the side of the cell container as illustrated in FIG. 3a.

The anodic electrode (negative electrode) of the discharging assembly may be considered as consisting of one anode when all the metallic material in the anode beds in the first space is a continuous body and considered as consisting of a plurality of anodes when the anode beds are only partially filled by the metallic material with the embodiment in FIG. 1a.

The discharging assembly of the electrochemical system may also comprise a stirring mechanism 601, which for example may be a rod or a bar, inserted in the discharging anode for higher packing density and better distribution of the metallic materials in the anode as shown in FIG. 2f. The stirring mechanism can be powered by the same motor that powers the whipping mechanism 280 through extension 602 or alternatively by an independent power source such as a motor, compressed air or compressed fluid. The stirring mechanism, depending on the specific design, may generate linear, angular, rotational or vibration movement. The discharging assembly, as shown in FIG. 2g, may further comprise a baffle 603 between the oxygen cathodes to direct the metallic material toward the surface of the cathodes as the material moves downward during discharging. The baffle may be made of plastic material or a conductive material such as a metal, in the case of which the conductive material may also serve as the current collector for the discharging anode.

The oxygen cathode 301 in the discharging assembly of the embodiment shown in FIG. 1a is a planar structure with a cavity 302 as illustrated in FIG. 1c. The oxygen cathode comprises a frame 306 covered with two membrane oxygen electrodes 303 that are permeable to air but is impermeable to water. The surfaces of the oxygen cathodes are covered with a separator 304 to prevent direct contact between the cathodes and anodes. The oxygen cathode may alternatively be in non-planar structures with examples illustrated in FIG. 1d. The cavity 302 within the cathode is for holdinging air or oxygen or a gas containing oxygen to allow the reduction of oxygen. The cavity is completely sealed except for an inlet and an outlet to allow air or gas passing through. The air is supplied into the cavities of the oxygen cathodes by an air pump (not shown in the figures) that is located, as shown at FIG. 3, external of the electrochemical cell via inlet 312, manifold 311 and tubes 310 and leaving the cavity via tubes 310a, manifold 311a and outlet 312a on the top of the container 110. It may be beneficial that tubes 310 and 310a and electric lead 321 (shown at FIG. 1c) are bundled together or made into a single element for simplifying the structure. Alternatively, air or oxygen may be conducted to the oxygen cathode through the side of the cell container via inlet our outlet 313 and 313a as shown in FIG. 3b. The oxygen membrane electrode 303 is supported with a corrugated board 305 (see FIG. 1c) to prevent yielding of the membrane electrode under the pressure from the surrounding electrolyte.

The oxygen cathode of such design has the advantage of allowing independent removal of individual oxygen cathode without affecting other cathodes in the discharging assembly, and thus allowing convenient changing of cathodes or cleaning of the cell container when needed. It also has the advantage of maintaining the discharging function of the system when electrolyte leakage occurs in one oxygen cathode when there is a plurality of cathodes in the discharging assembly.

The cell container 110 (or tank) can be made of plastic materials. Preferably, the container is made of a continuous piece of plastic material with no discontinuity, such as holes and gaps, exists below the surface 401 (see FIG. 6) of electrolyte such that there is no possibility of electrolyte leakage to outside of the cell. This is a particular advantage over the conventional designs of metal-air cells, in which the sides of cell container are covered by air electrodes and are prone to leaking of electrolyte. On cover 120 of the container, there is a gas outlet with filter 420 (see FIG. 1a) to retain the electrolyte in the mist, containing mainly oxygen, generated during the operation of the system. There may be also catalytic material disposed in the filter 420 for recombination of the small amount of hydrogen that may be generated during the operation of the system as a side reaction. On the cover 120 there may also have other elements such as terminals for electrical conduction, air inlet and outlet, a motor or an air pump. The dimension and shape of the container 110 is determined according to the actual designs of the charging and discharging assemblies. The height of the cell container can be varied to change the space 102 (second space) without affecting the structures of the charging and discharging assemblies of the cell. This flexible variation of the second space that change the volume between the charging and the discharging assemblies allows for variation of energy storage capacities with only marginal impact on the manufacturing and cost of the cell. As metallic material can be contained in the second space to form pile 502 (see FIG. 2a) above the discharging assembly, the cell can have a large storage capacity or long runtime.

During the discharging operation of the cell, the anodes 500 are consumed as the metal deposit is dissolved and the dissolved metal in the electrolyte is transported out of the anode spaces with electrolyte via diffusion and convection and returns to the charging assembly. The material in pile 502 above the anodes falls into the anode spaces as the solid anode material is consumed, which maintains the electrochemical activity of the anodes.

An alternative embodiment is to house the charging assembly and the discharging assembly side by side as illustrated in FIG. 6. The compartment of charging assembly and the compartment of the discharging assembly is separated by a divider 111 which is permeable to electrolyte and allows passing of electrolyte but not permeable to solid metal material such that the electrolyte is shared in both compartments. The metal deposits formed on the side of charging assembly is moved to the side of discharging assembly by pump 1201 through pipes 1202 and 1203. In the embodiment illustrated in FIG. 6, the electrodes of the charging assembly are parallel to the electrodes of the discharging assembly. Alternatively, it may be structured such that the electrodes of the charging assembly are perpendicular or in some other angle relative to the electrodes of the discharging assembly.

Another alternative embodiment is to have more than one cell in a single container as illustrated in FIG. 7, where three cells are contained in one container. Cells 1, 2 and 3, each comprise a charge assembly and discharging assembly, and each is separated by a wall 112 which is impermeable to electrolyte such that there is no electrochemical interference between the cells. The cells in this embodiment can be connected in series to give a higher voltage of the system contained in the container. This embodiment may also have the advantage of sharing the motion mechanism, through a motion transmission device 281 and shaft 282, needed for removal of deposits on the cathodes of the charging assemblies in the cells. The same construction may be just one cell with multiple compartments separated by walls through which or over which electrolyte can pass.

An alternative embodiment is to comprise a mechanism to circulate the electrolyte within the system. One mechanism for circulating electrolyte is to add a chamber that is in proximity, adjacent, next or close to the first space. FIGS. 8a and b shows the embodiment of the electrochemical system with a chamber 103 below the discharging assembly. The chamber is separated from the first space in the discharging assembly by a separator or a filter material 1101 that is supported by a perforated plate 1102. In operation the electrolyte can be circulated by a pump 1105 via pipes 1104 and 1106 among the first space, the second space and the chamber in either direction (in FIG. 8a direction of flow as indicated by 1007 and 1007a is from the second space to the first space to the chamber). Alternatively, as shown in FIG. 8d, there are plurality of chambers which are separated by a wall 606, each chamber corresponding to one pair of the discharging cathodes such that the electrolyte may circulate through the anode area between each pair of the oxygen cathodes through manifold 607, tubing 608 and pump 1005. As a further variation, instead individual chambers electrolyte circulation for the corresponding anode spaces can be accomplished using a pipe 609 with holes 610 along its length placed in each anode bed as illustrated in FIG. 8e.

The electrolyte circulation as a forced convection can help the process of concentration homogenization of the electrolyte in different locations within the cell and can improve the performance of the electrochemical system particularly at high current densities. At high current densities, the metal concentration may be depleted near the cathode surfaces of the charging assembly during charging and may be highly concentrated in the anode spaces between oxygen cathodes of the discharging assembly during discharging. Electrolyte circulation can help increase the metal concentration near the cathode surfaces of the charging assembly and remove the dissolved metal in the discharging assembly.

As a further variation, as shown in FIG. 8c there is a baffle between 604 the oxygen cathodes that separates the first space and the chamber. The electrolyte can be circulated between the first space and the chamber through gaps 605 at the lower end of the baffle, which have the benefit of having the electrolyte flow path closer to the discharging cathode surfaces where the concentration of the dissolved zinc is higher.

The chamber 103 may also be positioned beside of the first space and second space as illustrated in FIG. 9a where the chamber is separated by a wall 112 from the first and second spaces except for a section of areas beside the discharging assembly where electrolyte is allowed to pass through. Alternatively, the chamber may also be extended to the side as illustrated in FIG. 9b; the relatively large size of the chamber can be advantageous when more electrolyte is desirable for extended storage capacity.

The further variation of the embodiment is illustrated in FIG. 10 where an independent and detachable tank 110a is connected with cell container 110 with pipe 1008 and joints 1009 and 1010 to store extra electrolyte for additional and optional energy storage capacity. The electrolyte in tank 110a and in the cell container 110 can be circulated by pump 1105 via pipes 1104 and 1106.

The embodiment with electrolyte circulation can also be used in a system where multiple cells are places in a single container as illustrated in FIG. 11. In FIG. 11 there is only one cathode in the charging assembly and one oxygen cathode in the discharging assembly.

It is also possible for a system to have only on charging cathode and one charging anode and one oxygen cathode in container 110 as illustrated in FIG. 12a (the other components including pump, pipes, and anode current collector is omitted for simplicity). As a further variation, a single cell may have only two oxygen electrodes 303 mounted on side opening of container 110 as illustrated by FIG. 12b, which allows the direct access of oxygen in the air without having to pump air through into the system.

The active metal for the reactions in the electrochemical cell system may be zinc, aluminum, magnesium, lead, and iron and their alloys. The metal or alloy may be further alloyed with other elements such as indium, bismuth, tin, gallium, antimony, calcium and cadmium for controlling hydrogen side reaction or morphology of the metal deposits.

The electrolyte may be an aqueous solution made of soluble chemicals of including but not limited to solutions of chlorides, sulfates, phosphates, hydrochloric acid, sulfuric acid, sodium hydroxide, potassium hydroxide and lithium hydroxide.

Depending on the active metal and electrolyte, the conductive material 231 of the cathodes of the charging assembly may be graphite, carbon, magnesium, aluminum, stainless steel, titanium and zirconium. The insulating material 232 may be plastics or ceramics. The anodes 220 of the charging assembly may be made of carbon, graphite, stainless steel, steel, titanium alloys, zirconium alloys and nickel alloys.

In a preferred embodiment, the active metal is zinc. The cathode substrate, the conductive material 231, for zinc deposition in the charging assembly may be made of metals or alloys including but not limited to magnesium, titanium, zirconium, tantalum graphite, and chromium. The anodes in the charging assembly 220 may be made of metals and alloys including but not limited to steels, carbon, graphite, stainless steels, titanium, and nickel alloys. The electrolyte may be aqueous solutions of potassium hydroxide, sodium hydroxide or lithium hydroxide and is preferably potassium hydroxide. The concentration of potassium hydroxide solutions may range between 10 to 45%. Zinc has a high solubility in concentrated potassium solutions, about 1 molar at 35% KOH, and can form supersaturated solutions 2 to 3 times of the normal solubility, allowing storage of high content of potential energy in the solutions. The zinc metallic material may be alloyed with one or more other elements including but not limited to aluminum, magnesium, tin, bismuth, indium, gallium, lead, antimony and cadmium.

As a preferred active metal, zinc has a unique set of technical and economical attributes including low equilibrium potential, good electrochemical reversibility, fast reaction kinetics, large over potential for hydrogen reaction, good conductivity, low equivalent weight, high specific energy, high volumetric energy density, abundance, low cost, low toxicity, and ease of handling (X. G. Zhang, Corrosion and Electrochemistry of Zinc, Springer and Zinc Electrodes, Encyclopedia of Electrochemical Power Sources, Elsevier). These attributes make zinc a favorable anode material for electrochemical power sources since the invention of battery two hundred years ago.

The good electrochemical reversibility and fast reaction kinetics mean zinc can dissolve and deposit readily near its equilibrium potential. The large over potential for hydrogen reaction means that zinc is stable in aqueous solutions and a high current efficiency during deposition.

In a zinc-oxygen cell, zinc dissolves to form zincate ions during discharge and zincate ions are reduced to form metal deposit during charge according to the following equation (Vanýsek, Petr (2011) "Electrochemical Series," in CRC Handbook of Chemistry and Physics, 92nd Edition, CRC Press):

$$Zn(OH)_4^{2-}+2e \leftrightarrows Zn+4OH^- E^0=-1.20V$$

Concurrently, oxygen is reduced during discharge and hydroxyl ions are oxidized during charge according to the following equation (Vanýsek (2011) supra.):

$$O_2=2H_2O=4e \leftrightarrows 4OH^- E^0=0.40V$$

The overall reaction in the cell is $$Zn+O_2+2H_2O+2e \leftrightarrows Zn(OH)_4^{2-} E^0+1.60V$$

In the embodiments of the present invention, zinc metal is deposited on the cathodes in the charging assembly. The deposited metallic zinc material is dislodged from the surface of the cathode periodically through a mechanical means such as wipers. The cathode substrate material for zinc deposition may be magnesium, titanium, zirconium, tantalum and their alloys or conductive substrates coated with these metals or alloys, on which the metal deposits may be easily removed by wipers. As a preferred embodiment the cathode for zinc deposition is made of magnesium or its alloys.

In a particular embodiment, the cathode 230 for zinc deposition comprises a plurality of discrete active surfaces made of conductive material 231. The discrete surfaces, on which metal is deposited, are isolated by insulating material 232 as indicated FIG. 2c and 2d. The material deposited on such electrode can be more uniformly distributed in the anode spaces in the discharging assembly.

The electrochemical cell system of the present invention can be used as an electrical storage system and a power source with variable storage and power capacity by connecting together individual cells as illustrated in FIG. 13, where a group of cells are in series connection. Individual cells or groups of cell series can also be connected in parallel depending on the design requirements for output voltage and current etc. One particular novel feature of the present invention is that the system can be used as an electrical energy storage and a power source at the same time, that is concurrent charging and discharging or simultaneously, which is not possible with conventional batteries. FIGS. 14a and b show two charging and discharging profiles, wherein the charging and discharging are continuous with time in FIG. 14a, but are alternating with time in FIG. 14b. The system of the present invention can function with both profiles while in contrast conventional batteries can only function with the alternating charging and discharging profile.

The concurrent charging and discharging can be used for many potential applications that are not possible with conventional batteries. For example, the system of present invention can allow continuously converting unstable power, such as solar or wind power, into a stable power as illustrated in FIG. 15. Furthermore, it allows for full use of energy sources such as wind and solar without interruption unlike a conventional battery which needs to be discharged once it is fully charged.

As a variation of the present invention, the electrochemical system can also be designed for the charging and discharging assemblies to locate in separate containers for independent charging and discharging cells as illustrated in FIGS. 16a and b. The independent discharging cells and independent charging cells provide a range of possible applications that are not feasible for the embodiment with charging and discharging assemblies in the same container. As a varied embodiment, the discharging only cell (without charging assembly) has a chamber in proximity to the discharging assembly for electrolyte circulation as illustrated in FIG. 16c. As well, use of triangularly shaped oxygen cathodes 301a in this embodiment makes the removal of discharged material easier; the content may be poured out by turning the container sideway or upside down.

In one embodiment, one or more of the discharging units (each may have a group of cells) can be integrated with a charging unit (can viewed as centralized metal deposition), which may consist of one or a plurality of cells, as shown in FIG. 17a. The metallic material and electrolyte in the charging unit 100b and the discharged material in the discharging cells 100a can be transported via a reservoir 100c through pipes and pumps 710, 711, 720, 721, 730 and 731. The charged material from the charging unit 100B which may have one or more discharging cells can also be pumped to a plurality of strings of discharging units as illustrated in FIG. 17b. The centralized deposition or electroplating may bring operational benefits for large scale systems, similar to electrowinning plants in the metal refining industry, which may be viewed as plants for large scale energy storage.

In another embodiment, the charging units and discharging units can be located in different locations for certain applications, for example, as conceptually illustrated in FIGS. 18a,c (path 1). The discharging units can be used as back-up power sources or power sources for mobile devices such as vehicles. The discharging units after being fully discharged can then transported back to the location of the charging units for removing the discharged material and refill with fresh metallic material. For easy removal of the discharged material the oxygen cathodes in the discharging cell may be tapered, such as triangular shape, as shown in FIG. 1d and FIG. 16c. Alternatively, instead of transporting the discharging unit back and forth, only the charged and discharged materials are transported using containers 100c between the locations for charging and discharging (FIGS. 18a, b, and c path 2). Transporting only the active materials in containers without the electrodes and the associated components can greatly reduce the complexity and cost of the transportation.

The option of using simple containers to contain only the active materials also allows to store energy economically for long times, i.e. days, weeks, or even months. It is obvious that to store only low cost materials (for example zinc and KOH solutions) in low cost containers (made of e.g. plastics), have a great cost advantage over other types of energy storage such as batteries which generally have a complex structure. This potential application may have a significant implication on the future growth of renewable energy; as large scale of electricity storage for long times (days, weeks, or months) would become essential in the future when a large portion of society's electricity is generated by weather dependent energy sources such as solar and wind.

The cell having only the discharging assembly can also have the option of using materials that are not electro deposited, that is, that are produced by metallurgical or mechanical means. In the case of zinc, particulate materials such as zinc powder or zinc pellets produced by thermal spraying or casting can be used as the active anode material in the discharging cells in the discharging only cells. It may be operated by mechanically filling or loading the cell with fresh anode material and electrolyte and removing out (pouring or pumping) the discharged material after discharging. The embodiment of the discharging cell consisting of triangular oxygen cathodes (shown in FIG. 1d) allows effective loading and empting the discharging cell. Furthermore, such a discharging only cell allows the use of the metals that is not feasible to be reduced electrochemically in aqueous solutions. In particular, the embodiment of the cell with only the discharging assembly allows the use of aluminum and magnesium, which have much higher energy densities than zinc but are not effectively reducible in aqueous solutions. In operation, anode material in the form of particulates such as powders or pellets can be loaded together with electrolyte, either separately or as a mix, into the discharging cell. The electrolyte after discharging can be pumped out or pour out of the cell and the cell is ready for adding fresh material and electrolyte. This embodiment of using aluminum or magnesium has the advantage in applications as mobile power sources for which high energy density is an important requirement.

FIGS. 19 and 20 schematically illustrates another embodiment of the present invention which allows the use of liquid form of reactants instead of gaseous form like oxygen. Redox couples that may be suitable for use in this embodiment includes $Br_2/Br^{2-}$, $Fe^{2+}/Fe^{3+}$, $Ce^{3+}/Ce^{4+}$, $VO^{2+}/VO_2^{+}$, and other redox couples that have a potential positive to that of zinc. The chemical agents of the redox couples can be dissolved in a suitable electrolyte with sufficient quantities and thus can be transported in a fluidic form.

As a specific embodiment, for example, the redox couple for the reactions on the positive electrodes is based on bromine and the metallic material is zinc, that is, it is a zinc-bromine chemistry. The reactions for this example can be represented as follows (P.C. Butler et al, Zinc/Bromine Batteries in Handbook of Batteries, McGraw Hill) (Vanýsek (2011) supra.):

| | | |
|---|---|---|
| Negative electrode | $Zn^{2+} + 2e \leftrightarrows Zn$ | $E^0 = 0.76$ V |
| Positive electrode | $Br_2 + 2e \leftrightarrows 2Br^-$ | $E^0 = 1.09$ V |
| Total reaction | $Zn + Br_2 \leftrightarrows ZnBr_2$ | $E^0 = 1.85$ V |

The electrochemical system using zinc-bromine reactions consists of two electrolytes, a negative electrolyte containing ZnBr and a positive electrolyte containing $Br_2/Br^-$. The two electrolytes are physically separated in order to prevent direct reaction between zinc and bromine. The negative electrolyte is stored inside the cell container 110. The positive electrolyte is stored in a tank 900 and is circulated in and out of the cell with pumps and pipes 912 and 922 as illustrated in FIG. 21. The size of the electrolyte tank for the positive electrolyte may vary depending on number of cells it connects with and the capacity of the cells.

For the embodiment illustrated in FIGS. 19 and 20, during charge zinc is deposited on the cathodes of the charging assembly while bromine ions in the electrolyte flowing through anode chambers 363 are reduced on electrodes 361. During discharge the zinc is oxidized into zinc ions in the discharge assembly while the bromine in the positive electrolyte flowing through the chambers 353 of the cathodes in the discharging assembly is reduced on electrodes 351. To separate the negative electrolyte and positive electrolyte, a separator or ionic selective membrane 352 and 362 covers the surfaces of the anodes in the charging assembly and the cathodes in the discharging assembly. The positive electrolyte is circulated through the anodes in the charging assembly via manifold (375), inlet (378) and outlet (378a); it is circulated through the cathodes of the discharging assembly via manifold (371), inlet (373) and outlet (373a). The two sets of inlets and outlets are connected via pipes (931, 931a, 932, and 932a) and valves (912 and 922) to an electrolyte container 900. As an alternative embodiment, the electrolyte for the positive electrode, that is, that containing bromine can be contained for each cell by adding a compartment 104 on the cell container as illustrated in FIG. 22. It is to be noted that although it is not particularly exemplified for the zinc-bromine system all the alternative embodiments and possible variations described and illustrated for the system involving oxygen as the reactant for the positive electrodes may also be applicable the zinc-bromine system.

The embodiment of the present invention for using redox reactions of bromine as the reactions for the positive electrodes has a big advantage over the current design of zinc-bromine flow batteries in which the capacity is limited by the thickness of the zinc electrode. The charging capacity and discharging capacity of the electrochemical system of the present invention is not limited by the thickness of the deposit on the cathode of the charging assembly neither by the thickness of the anode of the discharging assembly. Another advantage with the present invention is that the operation is insensitive to the morphology of the metal deposit and it allows the formation non-uniform deposits of zinc metallic material on the cathodes of during charging; the formation of non-uniform deposits is detrimental for the zinc-bromine batteries of the current designs.

The present invention has significant advantages over prior arts on metal fuel cells including at least: 1) it resolves the challenging problems relating to feeding metallic materials into individual cells and removing discharged material out of cells without clogging or jamming; 2) it allows the oxygen cathode to be constructed as a self contained component, like an air cartridge allowing air to pass through, and can be independently removed from the discharging assembly. It thus allows convenient removal of individual air cathodes for service and maintenance without affecting the integrity of the cell; and 3) it allows the use a container made of single continuous piece of plastic material to contain all elements that are in touch with electrolyte inside the container, which removes the possibility of potential electrolyte leaking out the cell. In comparison to conventional batteries, the electrochemical system of the present invention has the advantages of: 1) it can perform concurrent charging and discharging functions; 2) it allows large capacities and flexible and low cost capacity scaling; 3) it allows charging and discharging to be operated at different locations; and 4) it allows energy storage for long times at low cost as on the active materials (without electrodes) can be stored in simple plastic containers. The present invention can potentially be used in a wide range of applications including but not limited for: 1) economical storage of renewable energy such as solar and wind; 2) improving the stability and efficiency of electrical grid; 3) as the storage device for off-grid or micro grid distributed power source systems; 4) as back up or UPS power sources: 5) as power sources for mobile applications; and 6) back up long term electricity storage for emergency situations and for situations when there is interruption of electricity supply from renewable energy sources due to bad weather.

The working principle and functionalities of the present invention are further demonstrated by the following example. The example and their particular details set forth herein are presented for illustration only and should not be construed as a limitation on the claims of the present invention.

EXAMPLE(S)

A cell was constructed according to the embodiment schematically illustrated in FIG. 2b. The cell container, made of Plexiglas, has an interior dimension of 24 cm in length, 13 cm in width and 50 cm in height. The charging assembly had one cathode and two anodes. The anodes were flat sheets of stainless steel of 1 mm in thickness. The active surface of cathode was made of pure magnesium with a plurality of discrete active surface areas of 5 mm×5 mm that were separated by 5 mm inactive zones. The inactive zones and the edges of the cathode were covered with epoxy resin. The dimension of the cathode was 21 cm×21 cm. The total number of discrete active areas was 632 for the two sides and a total area of a cathode was 158 $cm^2$. The distance between the cathode and anodes was 1 cm. The charging assembly was mounted on the cell container with bars made of a plastic material Acetal and the top edge of the assembly is 6 cm from the top of the container. The wipers were made of plastic material Derin. The wipers were mounted on the horizontal draft made of stainless steel, which was mechanically joined to a set of drive worm gears which was connected to a motor mounted on top of the cell container.

The discharging assembly had three air cathodes that were spaced for 2.5 cm to form two anode spaces. The cathode in the middle had membrane oxygen electrode on both sides of the surfaces while only one membrane electrode on the two end cathodes. The cathode had a dimension of 22 cm×12 cm×1 cm with a 20 cm×10 cm×0.9 cm cavity sealed within the cathode. The active surface area on each side of the cathode is 200 $cm^2$. The cathode had a frame made of Plexiglas and the membrane oxygen electrodes were glued on the frame. The membrane oxygen electrode was obtained from Reveo Inc, N.Y., United States. The membrane oxygen electrode was mechanically joined to a strip of stainless steel that led to the outside of the cell to serve as the current conductor. The surfaces of oxygen cathodes and the stainless strips were covered with a separator material (FS2227E produced by Freudenberg Nonwovens L.P, NC, United States). There was an opening on each end of the cathode and the openings were joined with vinyl tubes for passing air which was supplied with an air pump. A copper strip, a part of which was laid on the bottom of each anode space in the discharging assembly, serves as current collector for the zinc anode. The electrolyte was 34% KOH containing 0.5 M of zinc oxide. The anode spaces of the discharging assembly were filled with zinc deposits.

The cell was tested using a battery testing equipment. FIG. 23 shows the results of two 10 hours cycles of charging and discharging. This example demonstrated that the electrochemical cell system of the present invention can be reduced to practice.

The above description and illustrated embodiments have been provided to illustrate the basic structural and functional principles of the present invention and shall not be interpreted to be limiting. It is apparent that those with skills in the art who review this disclosure will readily see the various possible combinations, changes and modifications in the structure, parts, elements, materials, arrangements, and functionality without departing from the spirit and scope of the present invention. Accordingly, any modifications and equivalents that can be readily conceived from the teaching of this document should be considered falling within the scope of the present invention specified in the following claims.

What is claimed is:

1. An electrochemical cell system, comprising:

a housing;

an electrolyte disposed in the housing;

[a plurality of] *one or more* discharging cathodes immersed in the [same body of] electrolyte and a [plurality of] first [spaces between] *space adjacent* and exterior to the *one or more* discharging cathodes, a cavity formed inside each of the [plurality of] *one or more* discharging cathodes, air or an oxygen-containing gas passing through the cavity, and an exterior surface of each of the plurality of discharging cathodes exposed to the electrolyte[,]*;* a single second space above the [plurality of] first [spaces] *space* and above the [plurality of] *one or more* discharging cathodes, the single second space communicative with the [plurality of] first [spaces] *space*; and a single discharging anode formed by a continuous body of metallic material placed in the single second space and the [plurality of] first [spaces] *space*.

2. The electrochemical cell system of claim 1, wherein the *one or more* discharging cathodes comprise a tapered profile, the top being narrower than the bottom.

3. The electrochemical cell system of claim 1, wherein the portion of the housing in contact with the electrolyte is impermeable to air.

4. The electrochemical cell system of claim 1, wherein each of the *one or more* discharging cathodes is removable from the housing.

5. The electrochemical cell system of claim 1, wherein each of the *one or more* discharging cathodes comprises the cavity enveloped by one or more oxygen membrane electrodes.

6. The electrochemical cell system of claim 1, wherein each of the *one or more* discharging cathodes comprises:

(a) one or more oxygen electrodes, (b) the cavity being enclosed by the oxygen electrodes, (c) an inlet passing the air or the oxygen-containing gas into the cavity, and (d) an outlet passing the air or the oxygen-containing gas out of the cavity.

7. The electrochemical cell system of claim 1, wherein the metallic material comprises a metal selected from the group consisting of zinc, aluminum, iron, lead, magnesium, bismuth, indium, tin, antimony, [cadmium or an alloy of the metal]*cadmium, and alloys thereof.*

8. The electrochemical cell system of claim 1, further comprising a chamber in fluid communications with the first spaces.

9. The electrochemical cell system of claim 1, further comprising a charging cell comprising:

(a) a container, (b) an electrolyte disposed in the container, and (c) a charging assembly comprising at least one charging anode and one charging cathode immersed in the electrolyte to generate the metallic material by electro deposition.

10. The electrochemical cell system of claim 9, further comprising one or more pumps for transport of the metallic material and electrolyte between the housing and the container.

11. The electrochemical cell system of claim 1 , wherein at least one of the *one or more* discharging cathodes comprises a frame covered with at least one oxygen membrane electrode forming the cavity, and an inlet and outlet for passage of oxygen or an oxygen containing gas in and out of the cavity.

12. The electrochemical cell system of claim 1, further comprising a pump for circulating the electrolyte through the first space.

13. The electrochemical cell system of claim 1, further comprising at least one chamber in proximity of the discharging assembly and is in electrolytic communication with the first space and the second space.

14. The electrochemical cell system of claim 1, wherein the system is a metal fuel cell (a) fueled by loading the metallic material and the electrolyte into the first space and the second space and (b) refueled at the end of discharging by (i) removing the discharged metallic material and electrolyte from the housing and (ii) loading in the first space and the second space with the metallic material and the electrolyte.

15. The electrochemical cell system of claim 1, further comprising a charging assembly disposed in the housing and at least partially immersed in the electrolyte, the charging assembly having at least one charging anode and one charging cathode for generating the metallic material through electrodeposition.

16. The electrochemical cell system of claim 15, wherein the charging assembly is above the discharging assembly.

17. The electrochemical cell system of claim 15, further comprising a chemical agent for the electrochemical reactions on the positive electrodes of the charging assembly and discharging assembly, and the chemical agent is selected from a group consisting of oxygen, bromine, chlorine, iron salts, vanadium salts, chromium salts, titanium salts, and cerium salts.

18. The electrochemical cell system of claim 15 used for simultaneous charging and discharging.

19. The electrochemical cell system of claim 1, wherein each of the *one or more* discharging cathodes comprises:

(a) a frame;

(b) at least two oxygen electrodes respectively attached to at least two sides of the frame, the cavity being enclosed by the at least two oxygen electrodes;

(c) an inlet passing the air or the oxygen-containing gas into the cavity, and (d) an outlet passing the air or the oxygen-containing gas out of the cavity.

20. The electrochemical cell system of claim 19, further comprising a separator covering an exterior surface of each of the at least two oxygen electrodes.

* * * * *